United States Patent
Pawlowski

(10) Patent No.: US 8,214,672 B2
(45) Date of Patent: Jul. 3, 2012

(54) METHOD AND SYSTEMS FOR POWER CONSUMPTION MANAGEMENT OF A PATTERN-RECOGNITION PROCESSOR

(75) Inventor: J. Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 770 days.

(21) Appl. No.: 12/350,142

(22) Filed: Jan. 7, 2009

(65) Prior Publication Data
US 2010/0174929 A1    Jul. 8, 2010

(51) Int. Cl.
 *G06F 1/32* (2006.01)
(52) U.S. Cl. ........................ 713/320; 713/300
(58) Field of Classification Search .................. 713/320
 See application file for complete search history.

(56) References Cited

U.S. PATENT DOCUMENTS

| | | | |
|---|---|---|---|
| 5,300,830 A | 4/1994 | Hawes | |
| 5,331,227 A | 7/1994 | Hawes | |
| 5,602,764 A | 2/1997 | Eskandari-Gharnin et al. | |
| 5,615,162 A * | 3/1997 | Houston | 365/226 |
| 5,896,969 A * | 4/1999 | Meier-Burkamp | 192/64 |
| 6,240,003 B1 | 5/2001 | McElroy | |
| 6,553,525 B1 * | 4/2003 | Shephard, III | 714/733 |
| 6,768,659 B2 * | 7/2004 | Gillingham et al. | 365/49.16 |
| 6,880,087 B1 | 4/2005 | Carter | |
| 6,906,938 B2 | 6/2005 | Kaginele | |
| 6,944,710 B2 | 9/2005 | Regev et al. | |
| 7,089,352 B2 | 8/2006 | Regev et al. | |
| 7,146,643 B2 | 12/2006 | Dapp et al. | |
| 7,392,229 B2 | 6/2008 | Harris et al. | |
| 7,437,402 B1 | 10/2008 | Schubert | |
| 7,663,961 B1 * | 2/2010 | Rowlands et al. | 365/227 |
| 7,881,125 B2 * | 2/2011 | Srinivasan et al. | 365/189.02 |
| 7,920,399 B1 * | 4/2011 | Nataraj et al. | 365/49.16 |
| 2003/0135653 A1 * | 7/2003 | Marovich | 709/250 |
| 2005/0219887 A1 | 10/2005 | Hsu et al. | |
| 2006/0228027 A1 * | 10/2006 | Matsugu et al. | 382/181 |
| 2007/0075878 A1 | 4/2007 | Furodet et al. | |
| 2007/0127482 A1 * | 6/2007 | Harris et al. | 370/392 |
| 2007/0282833 A1 | 12/2007 | McMillen | |

FOREIGN PATENT DOCUMENTS

GB  2330993  5/1999

OTHER PUBLICATIONS

Beesley, K. R.; Arabic Morphology Using Only Finite-State Operations; Xerox Research Centre Europe; pp. 50-57.
Bird, S. et al.; One-Level Phonology: Autosegmental Representations and Rules as Finite Automata; Association for Computational Linguistics; University of Edinburgh; vol. 20; No. 1; pp. 55-90; 1994.

(Continued)

*Primary Examiner* — Nitin Patel
(74) *Attorney, Agent, or Firm* — Fletcher Yoder

(57) ABSTRACT

Disclosed are methods and devices, among which is a device that includes a pattern-recognition processor. In some embodiments, the pattern-recognition processor includes a first block of feature cells coupled to a decoder via a first plurality of local input conductors, a first block-disabling circuit, and a plurality of global input conductors. The pattern-recognition processor further includes a second block of feature cells coupled to the decoder via a second plurality of local input conductors, a second block-disabling circuit, and the plurality of global input conductors.

34 Claims, 15 Drawing Sheets

OTHER PUBLICATIONS

Bispo, J. et al.; Regular Expression Matching for Reconfigurable Packet Inspection; IEEE.

Bispo, J. et al.; Synthesis of Regular Expressions Targeting FPGAs: Current Status and Open Issues; IST/INESC-ID, Libson, Portugal; pp. 1-12.

Brodie, B. et al.; A scalable Architecture for High-Throughput Regular-Expression Pattern Matching; Exegy Inc.; pp. 1-12.

Clark, C.; Design of Efficient FPGA Circuits for Matching Complex Patterns in Network Intrusion Detection Systems (Master of Science Thesis); Georgia Institute of Technology; pp. 1-56; Dec. 2003.

Clark, C.; A Unified Model of Pattern-Matching Circuits for Field-Programmable Gate Arrays [Doctoral Dissertation]; Georgia Institute of Technology; pp. 1-177; 2006.

Clark, C. et al.; Scalable Pattern Matching for High Speed Networks; Proceedings of the $12^{th}$ Annual IEEE symposium on Field-Programmable Custom Computing Machines (FCCM'04);Georgia Institute of Technology; pp. 1-9; 2004.

Clark, C. et al.; A Unified Model of Pattern-Matching Circuit Architectures; Tech Report GIT-CERCS-05-20;Georgia Institute of Technology; pp. 1-17.

Fide, S.; String Processing in Hardware; Scalable Parallel and Distributed Systems Lab; Proceedings of the $12^{th}$ Annual IEEE symposium on Field-Programmable Custom Computing Machines (FCCM'04);School of Electrical and Computer Engineering; Georgia Institute of Technology; pp. 1-9; 2004.

Fisk, M. et al.; Applying Fast String Matching to Intrusion Detection; Los Alamos National Laboratory; University of California San Diego; pp. 1-21.

Korenek, J.; Traffic Scanner-Hardware Accelerated Intrusion Detection System; http://www.liberouter.org/ ;2006.

Kumar, S. et al.; Curing Regular Expressions matching Algorithms from Insomnia, Amnesia, and Acaluia; Department of Computer Science and Engineering; Washington University in St. Louis; pp. 1-17; Apr. 27, 2007.

Lipovski, G.; Dynamic Systolic Associative Memory Chip; IEEE; Department of Electrical and Computer Engineering; University of Texas at Austin; pp. 481-492; 1990.

Lin, C. et al.; Optimization of Pattern Matching Circuits for Regular Expression on FPGA; IEEE Transactions on Very Large Scale Integrations Systems; vol. 15, No. 12, pp. 1-6; Dec. 2007.

Schultz, K. et al.; Fully Parallel Integrated CAM/RAM Using Preclassification to Enable Large Capacities; IEEE Journal on Solid-State Circuits; vol. 31; No. 5; pp. 689-699; May 1996.

Shafai, F. et al.; Fully Parallel 30-MHz, 2.5-Mb CAM; IEEE Journal of Solid-State Circuits, vol. 33; No. 11; pp. 1690-1696; Nov. 1998.

Sidhu, R. et al.; Fast Regular Expression Pattern Matching using FPGAs; Department of EE-Systems; University of Southern California; pp. 1-12.

Wada, T.; Multiobject Behavior Recognition Event Driven Selective Attention Method; IEEE; pp. 1-16; 2000.

Yu, F.; High Speed Deep Packet Inspection with Hardware Support; Electrical Engineering and Computer Sciences; University of California at Berkeley; pp. 1-217; Nov. 22, 2006.

Freescale and Kaspersky® Accelerated Antivirus Solution Platform for OEM Vendors; Freescale Semiconductors Document; pp. 1-16; 2007.

Noyes, et al., U.S. Appl. No. 12/253,966, filed Oct. 18, 2008, "System and Method of Indirect Register Access".

Noyes, et al., U.S. Appl. No. 12/253,967, filed Oct. 18, 2008, "Indirect Register Access Method and System".

Noyes, U.S. Appl. No. 12/265,421, filed Nov. 5, 2008, "Methods and Systems to Accomplish Variable Width Data Input".

Noyes, et al., U.S. Appl. No. 12/265,436, filed Nov. 5, 2008, "Bus Translator".

Noyes, U.S. Appl. No. 12/265,465, filed Nov. 5, 2008, "Pattern-Recognition Processor with Results Buffer".

Noyes, et al., U.S. Appl. No. 12/268,270, filed Nov. 10, 2008, "Methods and Systems for Directly Connecting Devices to Microcontrollers".

Noyes, U.S. Appl. No. 12/325,875, filed Dec. 1, 2008, "Systems and Methods for Managing Endian Mode of a Device".

Noyes, U.S. Appl. No. 12/325,986, filed Dec. 1, 2008, "Devices, Systems, and Methods to Synchronize Simultaneous DMA Parallel Processing of a Single Data Stream by Multiple Devices".

Noyes, U.S. Appl. No. 12/325,982, filed Dec. 1, 2008, "Systems and Methods to Enable Identification of Different Data Sets".

Noyes, U.S. Appl. No. 12/325,990, filed Dec. 1, 2008, "Devices, Systems, and Methods to Synchronize Parallel Processing of a Single Data Stream".

Noyes, U.S. Appl. No. 12/347,403, filed Dec. 31, 2008, "Systems, Methods, and Devices for Configuring a Device".

Pawlowski, U.S. Appl. No. 12/350,132, filed Jan. 7, 2009, "Pattern-Recognition Processor with Matching-Data Reporting Module".

Pawlowski, U.S. Appl. No. 12,350,136, filed Jan. 7, 2009, "Buses for Pattern-Recognition Processors".

Noyes, U.S. Appl. No. 12/352,311, filed Jan. 12, 2009, "Devices, Systems, and Methods for Communicating Pattern Matching Results of a Parallel Pattern Search Engine".

Harris, U.S. Appl. No. 60/652,738, filed Feb. 12, 2005, "Means and Mechanism for Finding Meaningful Information in Databases or Data Sets by Topical Content Patterns at Speeds Exceeding Conventional Computers".

Hurson A. R.; A VLSI Design for the Parallel Finite State Automaton and Its Performance Evaluation as a Hardware Scanner; International Journal of Computer and Information Sciences, vol. 13, No. 6. 1984.

* cited by examiner

METHOD AND SYSTEMS FOR POWER CONSUMPTION MANAGEMENT OF A PATTERN-RECOGNITION PROCESSOR

BACKGROUND

1. Field of Invention

Embodiments of the invention relate generally to pattern-recognition processors and, more specifically, in certain embodiments, to pattern-recognition processors having local input conductors.

2. Description of Related Art

In the field of computing, pattern recognition tasks are increasingly challenging. Ever larger volumes of data are transmitted between computers, and the number of patterns that users wish to identify is increasing. For example, spam or malware are often detected by searching for patterns in a data stream, e.g., particular phrases or pieces of code. The number of patterns increases with the variety of spam and malware, as new patterns may be implemented to search for new variants. Searching a data stream for each of these patterns can form a computing bottleneck. Often, as the data stream is received, it is searched for each pattern, one at a time. The delay before the system is ready to search the next portion of the data stream increases with the number of patterns. Thus, pattern recognition may slow the receipt of data.

Hardware has been designed to search a data stream for patterns, but this hardware often consumes excessive amounts of power. Some devices configured to search a data stream do so by distributing the data stream among a plurality of circuits. The circuits each determine whether the data stream matches a portion of a pattern. Often, a large number of circuits operate in parallel, each searching the data stream at generally the same time. Each of these circuits consumes electrical energy and generates heat. As a result, the amount of heat generated and the amount of electricity consumed scales with the number of patterns. In devices with a large number of circuits, the cost of the electricity and the difficulty of removing this heat complicate the use of pattern-recognition hardware.

DETAILED DESCRIPTION

Figure 1:
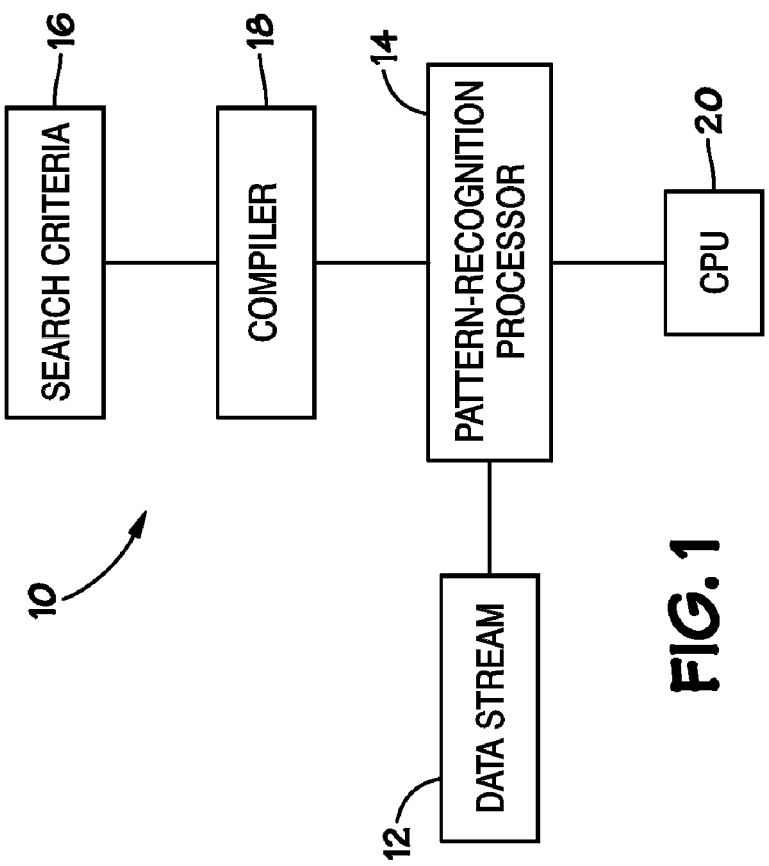
FIG. 1 depicts an example of system that searches a data stream.

FIG. 1 depicts an example of a system 10 that searches a data stream 12. The system 10 may include a pattern-recognition processor 14 that searches the data stream 12 according to search criteria 16.

Each search criterion may specify one or more target expressions, i.e., patterns. The phrase "target expression" refers to a sequence of data for which the pattern-recognition processor 14 is searching. Examples of target expressions include a sequence of characters that spell a certain word, a sequence of genetic base pairs that specify a gene, a sequence of bits in a picture or video file that form a portion of an image, a sequence of bits in an executable file that form a part of a program, or a sequence of bits in an audio file that form a part of a song or a spoken phrase.

A search criterion may specify more than one target expression. For example, a search criterion may specify all five-letter words beginning with the sequence of letters "cl", any word beginning with the sequence of letters "cl", a paragraph that includes the word "cloud" more than three times, etc. The number of possible sets of target expressions is arbitrarily large, e.g., there may be as many target expressions as there are permutations of data that the data stream could present. The search criteria may be expressed in a variety of formats, including as regular expressions, a programming language that concisely specifies sets of target expressions without necessarily listing each target expression.

Each search criterion may be constructed from one or more search terms. Thus, each target expression of a search criterion may include one or more search terms and some target expressions may use common search terms. As used herein, the phrase "search term" refers to a sequence of data that is searched for, during a single search cycle. The sequence of data may include multiple bits of data in a binary format or other formats, e.g., base ten, ASCII, etc." The sequence may encode the data with a single digit or multiple digits, e.g., several binary digits. For example, the pattern-recognition processor 14 may search a text data stream 12 one character at a time, and the search terms may specify a set of single characters, e.g., the letter "a", either the letters "a" or "e", or a wildcard search term that specifies a set of all single characters.

Search terms may be smaller or larger than the number of bits that specify a character (or other grapheme—i.e., fundamental unit—of the information expressed by the data stream, e.g., a musical note, a genetic base pair, a base-10 digit, or a sub-pixel). For instance, a search term may be 8 bits and a single character may be 16 bits, in which case two consecutive search terms may specify a single character.

The search criteria 16 may be formatted for the pattern-recognition processor 14 by a compiler 18. Formatting may include deconstructing search terms from the search criteria. For example, if the graphemes expressed by the data stream 12 are larger than the search terms, the compiler may deconstruct the search criterion into multiple search terms to search for a single grapheme. Similarly, if the graphemes expressed by the data stream 12 are smaller than the search terms, the compiler 18 may provide a single search term, with unused bits, for each separate grapheme. The compiler 18 may also format the search criteria 16 to support various regular expressions operators that are not natively supported by the pattern-recognition processor 14.

The pattern-recognition processor 14 may search the data stream 12 by evaluating each new term from the data stream 12. The word "term" here refers to the amount of data that could match a search term. During a search cycle, the pattern-recognition processor 14 may determine whether the currently presented term matches the current search term in the search criterion. If the term matches the search term, the evaluation is "advanced", i.e., the next term is compared to the next search term in the search criterion. If the term does not match, the next term is compared to the first term in the search criterion, thereby resetting the search.

Each search criterion may be compiled into a different finite state machine in the pattern-recognition processor 14. The finite state machines may run in parallel, searching the data stream 12 according to the search criteria 16. The finite state machines may step through each successive search term in a search criterion as the preceding search term is matched by the data stream 12, or if the search term is unmatched, the finite state machines may begin searching for the first search term of the search criterion.

The pattern-recognition processor 14 may evaluate each new term according to several search criteria, and their respective search terms, at about the same time, e.g., during a single device cycle. The parallel finite state machines may each receives the term from the data stream 12 at about the same time, and each of the parallel finite state machines may determine whether the term advances the parallel finite state machine to the next search term in its search criterion. The parallel finite state machines may evaluate terms according to a relatively large number of search criteria, e.g., more than 100, more than 1000, or more than 10,000. Because they operate in parallel, they may apply the search criteria to a data stream 12 having a relatively high bandwidth, e.g., a data stream 12 of greater than or generally equal to 64 MB per second or 128 MB per second, without slowing the data stream. In some embodiments, the search-cycle duration does not scale with the number of search criteria, so the number of search criteria may have little to no effect on the performance of the pattern-recognition processor 14.

When a search criterion is satisfied (i.e., after advancing to the last search term and matching it), the pattern-recognition processor 14 may report the satisfaction of the criterion to a processing unit, such as a central processing unit (CPU) 20. The central processing unit 20 may control the pattern-recognition processor 14 and other portions of the system 10.

The system 10 may be any of a variety of systems or devices that search a stream of data. For example, the system 10 may be a desktop, laptop, handheld or other type of computer that monitors the data stream 12. The system 10 may also be a network node, such as a router, a server, or a client (e.g., one of the previously-described types of computers). The system 10 may be some other sort of electronic device, such as a copier, a scanner, a printer, a game console, a television, a set-top video distribution or recording system, a cable box, a personal digital media player, a factory automation system, an automotive computer system, or a medical device. (The terms used to describe these various examples of systems, like many of the other terms used herein, may share some referents and, as such, should not be construed narrowly in virtue of the other items listed.)

The data stream 12 may be one or more of a variety of types of data streams that a user or other entity might wish to search. For example, the data stream 12 may be a stream of data received over a network, such as packets received over the Internet or voice or data received over a cellular network. The data stream 12 may be data received from a sensor in communication with the system 10, such as an imaging sensor, a temperature sensor, an accelerometer, or the like, or combinations thereof. The data stream 12 may be received by the system 10 as a serial data stream, in which the data is received in an order that has meaning, such as in a temporally, lexically, or semantically significant order. Or the data stream 12 may be received in parallel or out of order and, then, converted into a serial data stream, e.g., by reordering packets received over the Internet. In some embodiments, the data stream 12 may present terms serially, but the bits expressing each of the terms may be received in parallel. The data stream 12 may be received from a source external to the system 10, or may be formed by interrogating a memory device and forming the data stream 12 from stored data.

Depending on the type of data in the data stream 12, different types of search criteria may be chosen by a designer. For instance, the search criteria 16 may be a virus definition file. Viruses or other malware may be characterized, and aspects of the malware may be used to form search criteria that indicate whether the data stream 12 is likely delivering malware. The resulting search criteria may be stored on a server, and an operator of a client system may subscribe to a service that downloads the search criteria to the system 10. The search criteria 16 may be periodically updated from the server as different types of malware emerge. The search criteria may also be used to specify undesirable content that might be received over a network, for instance unwanted emails (commonly known as spam) or other content that a user finds objectionable.

The data stream 12 may be searched by a third party with an interest in the data being received by the system 10. For example, the data stream 12 may be monitored for text, a sequence of audio, or a sequence of video that occurs in a copyrighted work. The data stream 12 may be monitored for utterances that are relevant to a criminal investigation or civil proceeding or are of interest to an employer.

The search criteria 16 may also include patterns in the data stream 12 for which a translation is available, e.g., in memory addressable by the CPU 20 or the pattern-recognition processor 14. For instance, the search criteria 16 may each specify an English word for which a corresponding Spanish word is stored in memory. In another example, the search criteria 16 may specify encoded versions of the data stream 12, e.g., MP3, MPEG 4, FLAC, Ogg Vorbis, etc., for which a decoded version of the data stream 12 is available, or vice versa.

The pattern recognition processor 14 may be a hardware device that is integrated with the CPU 20 into a single component (such as a single device) or may be formed as a separate component. For instance, the pattern-recognition processor 14 may be a separate integrated circuit. The pattern-recognition processor 14 may be referred to as a "co-processor" or a "pattern-recognition co-processor".

Figure 2:
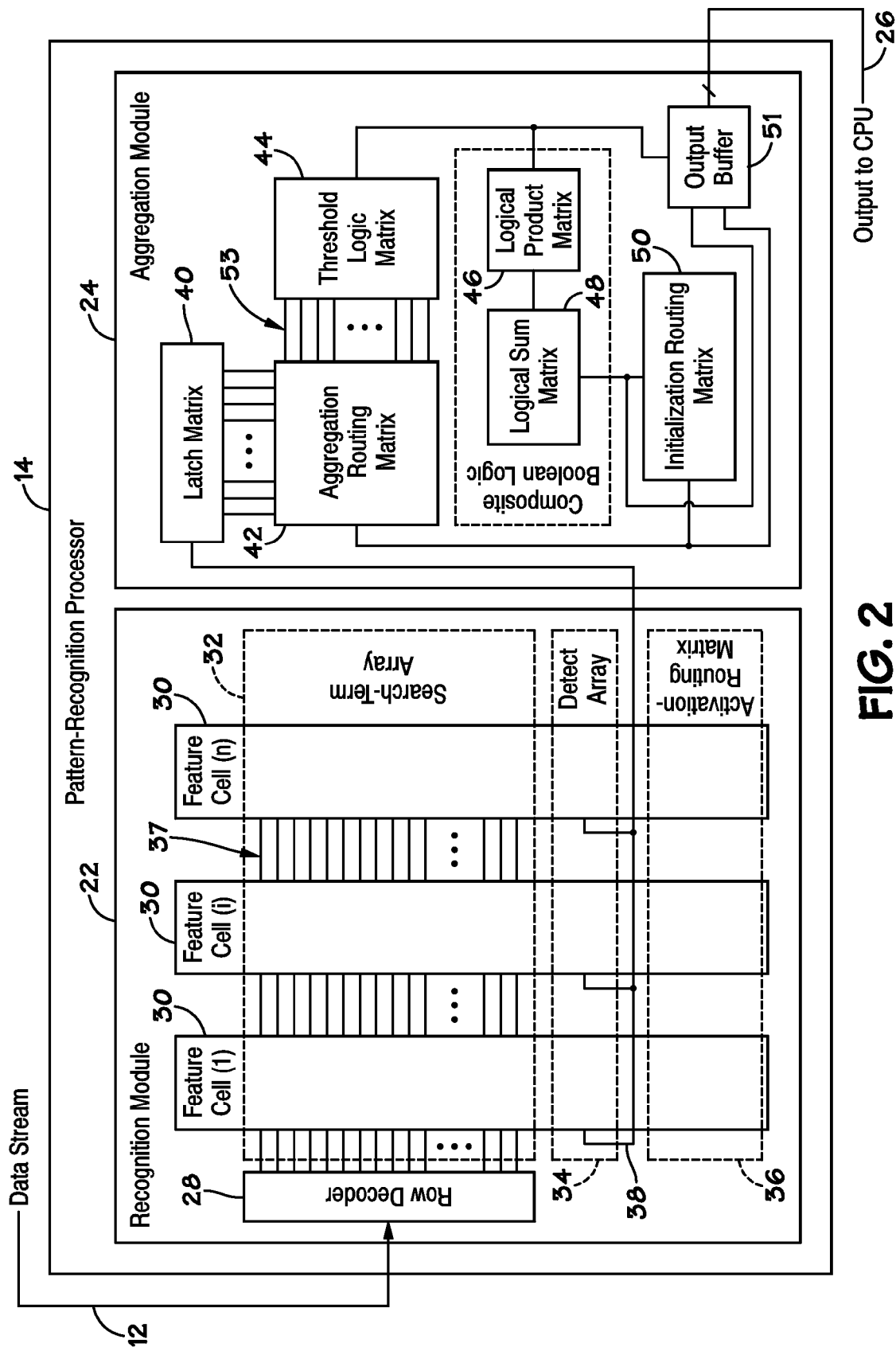
FIG. 2 depicts an example of a pattern-recognition processor in the system of FIG. 1.

FIG. 2 depicts an example of the pattern-recognition processor 14. The pattern-recognition processor 14 may include a recognition module 22 and an aggregation module 24. The recognition module 22 may be configured to compare received terms to search terms, and both the recognition module 22 and the aggregation module 24 may cooperate to determine whether matching a term with a search term satisfies a search criterion.

The recognition module 22 may include a row decoder 28 and a plurality of feature cells 30. Each feature cell 30 may specify a search term, and groups of feature cells 30 may form a parallel finite state machine that forms a search criterion. Components of the feature cells 30 may form a search-term array 32, a detection array 34, and an activation-routing matrix 36. The search-term array 32 may include a plurality of input conductors 37, each of which may place each of the feature cells 30 in communication with the row decoder 28.

The row decoder 28 may select particular conductors among the plurality of input conductors 37 based on the content of the data stream 12. For example, the row decoder 28 may be a one byte to 256 row decoder that activates one of 256 rows based on the value of a received byte, which may represent one term. A one-byte term of 0000 0000 may correspond to the top row among the plurality of input conductors 37, and a one-byte term of 1111 1111 may correspond to the bottom row among the plurality of input conductors 37. Thus, different input conductors 37 may be selected, depending on which terms are received from the data stream 12. As different terms are received, the row decoder 28 may deactivate the row corresponding to the previous term and activate the row corresponding to the new term.

The detection array 34 may couple to a detection bus 38 that outputs signals indicative of complete or partial satisfaction of search criteria to the aggregation module 24. The activation-routing matrix 36 may selectively activate and deactivate feature cells 30 based on the number of search terms in a search criterion that have been matched.

The aggregation module 24 may include a latch matrix 40, an aggregation-routing matrix 42, a threshold-logic matrix 44, a logical-product matrix 46, a logical-sum matrix 48, and an initialization-routing matrix 50.

The latch matrix 40 may implement portions of certain search criteria. Some search criteria, e.g., some regular expressions, count only the first occurrence of a match or group of matches. The latch matrix 40 may include latches that record whether a match has occurred. The latches may be cleared during initialization, and periodically re-initialized during operation, as search criteria are determined to be satisfied or not further satisfiable—i.e., an earlier search term may need to be matched again before the search criterion could be satisfied.

The aggregation-routing matrix 42 may function similar to the activation-routing matrix 36. The aggregation-routing matrix 42 may receive signals indicative of matches on the detection bus 38 and may route the signals to different group-logic lines 53 connecting to the threshold-logic matrix 44. The aggregation-routing matrix 42 may also route outputs of the initialization-routing matrix 50 to the detection array 34 to reset portions of the detection array 34 when a search criterion is determined to be satisfied or not further satisfiable.

The threshold-logic matrix 44 may include a plurality of counters, e.g., 32-bit counters configured to count up or down. The threshold-logic matrix 44 may be loaded with an initial count, and it may count up or down from the count based on matches signaled by the recognition module. For instance, the threshold-logic matrix 44 may count the number of occurrences of a word in some length of text.

The outputs of the threshold-logic matrix 44 may be inputs to the logical-product matrix 46. The logical-product matrix 46 may selectively generate "product" results (e.g., "AND" function in Boolean logic). The logical-product matrix 46 may be implemented as a square matrix, in which the number of output products is equal the number of input lines from the threshold-logic matrix 44, or the logical-product matrix 46 may have a different number of inputs than outputs. The resulting product values may be output to the logical-sum matrix 48.

The logical-sum matrix 48 may selectively generate sums (e.g., "OR" functions in Boolean logic.) The logical-sum matrix 48 may also be a square matrix, or the logical-sum matrix 48 may have a different number of inputs than outputs. Since the inputs are logical products, the outputs of the logical-sum matrix 48 may be logical-Sums-of-Products (e.g., Boolean logic Sum-of-Product (SOP) form). The output of the logical-sum matrix 48 may be received by the initialization-routing matrix 50.

The initialization-routing matrix 50 may reset portions of the detection array 34 and the aggregation module 24 via the aggregation-routing matrix 42. The initialization-routing matrix 50 may also be implemented as a square matrix, or the initialization-routing matrix 50 may have a different number of inputs than outputs. The initialization-routing matrix 50 may respond to signals from the logical-sum matrix 48 and re-initialize other portions of the pattern-recognition processor 14, such as when a search criterion is satisfied or determined to be not further satisfiable.

The aggregation module 24 may include an output buffer 51 that receives the outputs of the threshold-logic matrix 44, the aggregation-routing matrix 42, and the logical-sum matrix 48. The output of the aggregation module 24 may be transmitted from the output buffer 51 to the CPU 20 (FIG. 1) on the output bus 26. In some embodiments, an output multiplexer may multiplex signals from these components 42, 44, and 48 and output signals indicative of satisfaction of criteria or matches of search terms to the CPU 20 (FIG. 1). In other embodiments, results from the pattern-recognition processor 14 may be reported without transmitting the signals through the output multiplexer, which is not to suggest that any other feature described herein could not also be omitted. For example, signals from the threshold-logic matrix 44, the logical-product matrix 46, the logical-sum matrix 48, or the initialization routing matrix 50 may be transmitted to the CPU in parallel on the output bus 26.

Figure 3:
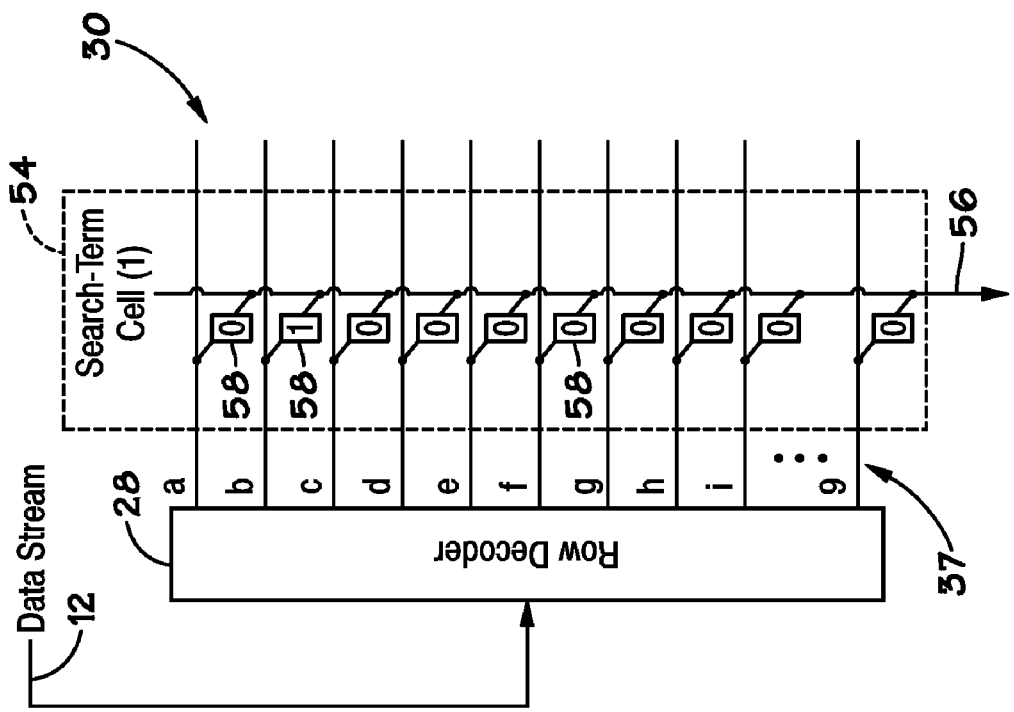
FIG. 3 depicts an example of a search-term cell in the pattern-recognition processor of FIG. 2.

FIG. 3 illustrates a portion of a single feature cell 30 in the search-term array 32 (FIG. 2), a component referred to herein as a search-term cell 54. The search-term cells 54 may include an output conductor 56 and a plurality of memory cells 58. Each of the memory cells 58 may be coupled to both the output conductor 56 and one of the conductors among the plurality of input conductors 37. In response to its input conductor 37 being selected, each of the memory cells 58 may output a value indicative of its stored value, outputting the data through the output conductor 56. In some embodiments, the plurality of input conductors 37 may be referred to as "word lines", and the output conductor 56 may be referred to as a "data line".

The memory cells 58 may include any of a variety of types of memory cells. For example, the memory cells 58 may be volatile memory, such as dynamic random access memory (DRAM) cells having a transistor and a capacitor. The source and the drain of the transistor may be connected to a plate of the capacitor and the output conductor 56, respectively, and the gate of the transistor may be connected to one of the input conductors 37. In another example of volatile memory, each of the memory cells 58 may include a static random access memory (SRAM) cell. The SRAM cell may have an output that is selectively coupled to the output conductor 56 by an access transistor controlled by one of the input conductors 37. The memory cells 58 may also include nonvolatile memory, such as phase-change memory (e.g., an ovonic device), flash memory, silicon-oxide-nitride-oxide-silicon (SONOS) memory, magneto-resistive memory, or other types of non-volatile memory. The memory cells 58 may also include flip-flops, e.g., memory cells made out of logic gates.

Figure 5:
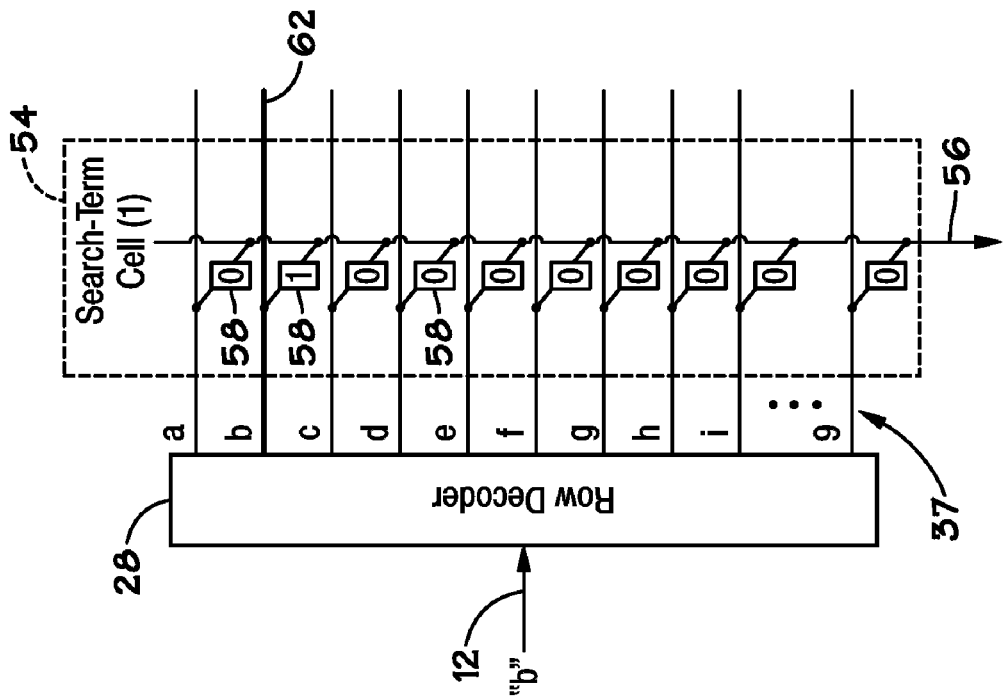
FIGS. 4 and 5 depict the search-term cell of FIG. 3 searching the data stream for a single character.
Figure 4:
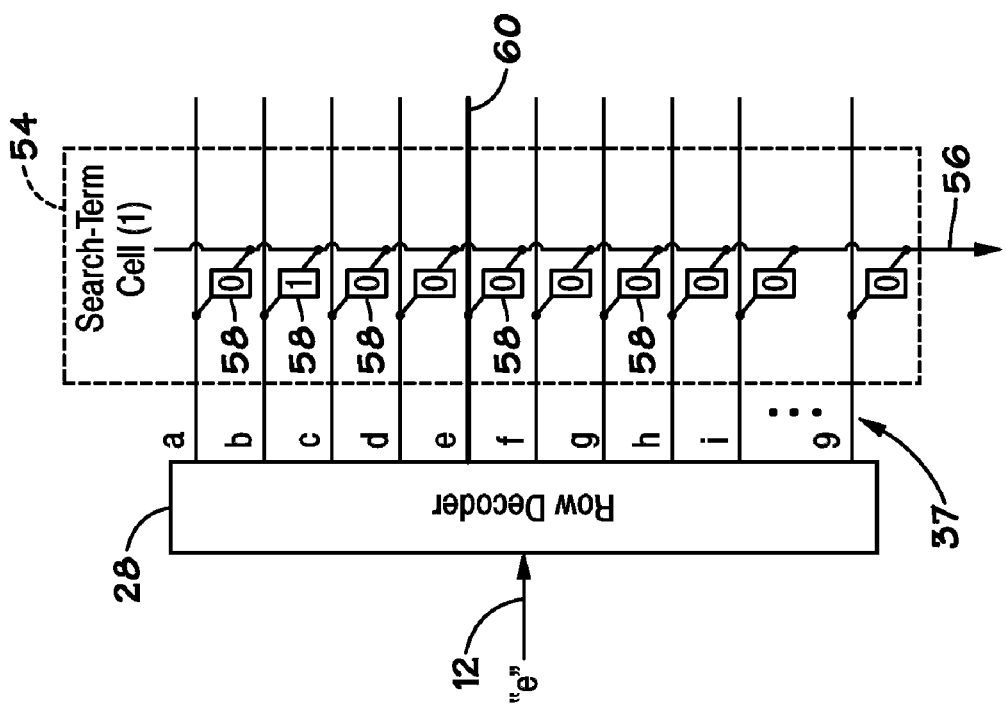

FIGS. 4 and 5 depict an example of the search-term cell 54 in operation. FIG. 4 illustrates the search-term cell 54 receiving a term that does not match the cell's search term, and FIG. 5 illustrates a match.

As illustrated by FIG. 4, the search-term cell 54 may be configured to search for one or more terms by storing data in the memory cells 58. The memory cells 58 may each represent a term that the data stream 12 might present, e.g., in FIG. 3, each memory cell 58 represents a single letter or number, starting with the letter "a" and ending with the number "9". Memory cells 58 representing terms that satisfy the search term may be programmed to store a first value, and memory cells 58 that do not represent terms that satisfy the search term may be programmed to store a different value. In the illustrated example, the search-term cell 54 is configured to search for the letter "b". The memory cells 58 that represent "b" may store a 1, or logic high, and the memory cells 58 that do not represent "b" may be programmed to store a 0, or logic low.

To compare a term from the data stream 12 with the search term, the row decoder 28 may select the input conductor 37 coupled to memory cells 58 representing the received term. In FIG. 4, the data stream 12 presents a lowercase "e". This term may be presented by the data stream 12 in the form of an eight-bit ASCII code, and the row decoder 28 may interpret this byte as a row address, outputting a signal on the conductor 60 by energizing it.

In response, the memory cell 58 controlled by the conductor 60 may output a signal indicative of the data that the memory cell 58 stores, and the signal may be conveyed by the output conductor 56. In this case, because the letter "e" is not one of the terms specified by the search-term cell 54, it does not match the search term, and the search-term cell 54 outputs a 0 value, indicating no match was found.

In FIG. 5, the data stream 12 presents a character "b". Again, the row decoder 28 may interpret this term as an address, and the row decoder 28 may select the conductor 62. In response, the memory cell 58 representing the letter "b" outputs its stored value, which in this case is a 1, indicating a match.

The search-term cells 54 may be configured to search for more than one term at a time. Multiple memory cells 58 may be programmed to store a 1, specifying a search term that matches with more than one term. For instance, the memory cells 58 representing the letters lowercase "a" and uppercase "A" may be programmed to store a 1, and the search-term cell 54 may search for either term. In another example, the search-term cell 54 may be configured to output a match if any character is received. All of the memory cells 58 may be programmed to store a 1, such that the search-term cell 54 may function as a wildcard term in a search criterion.

Figure 6:
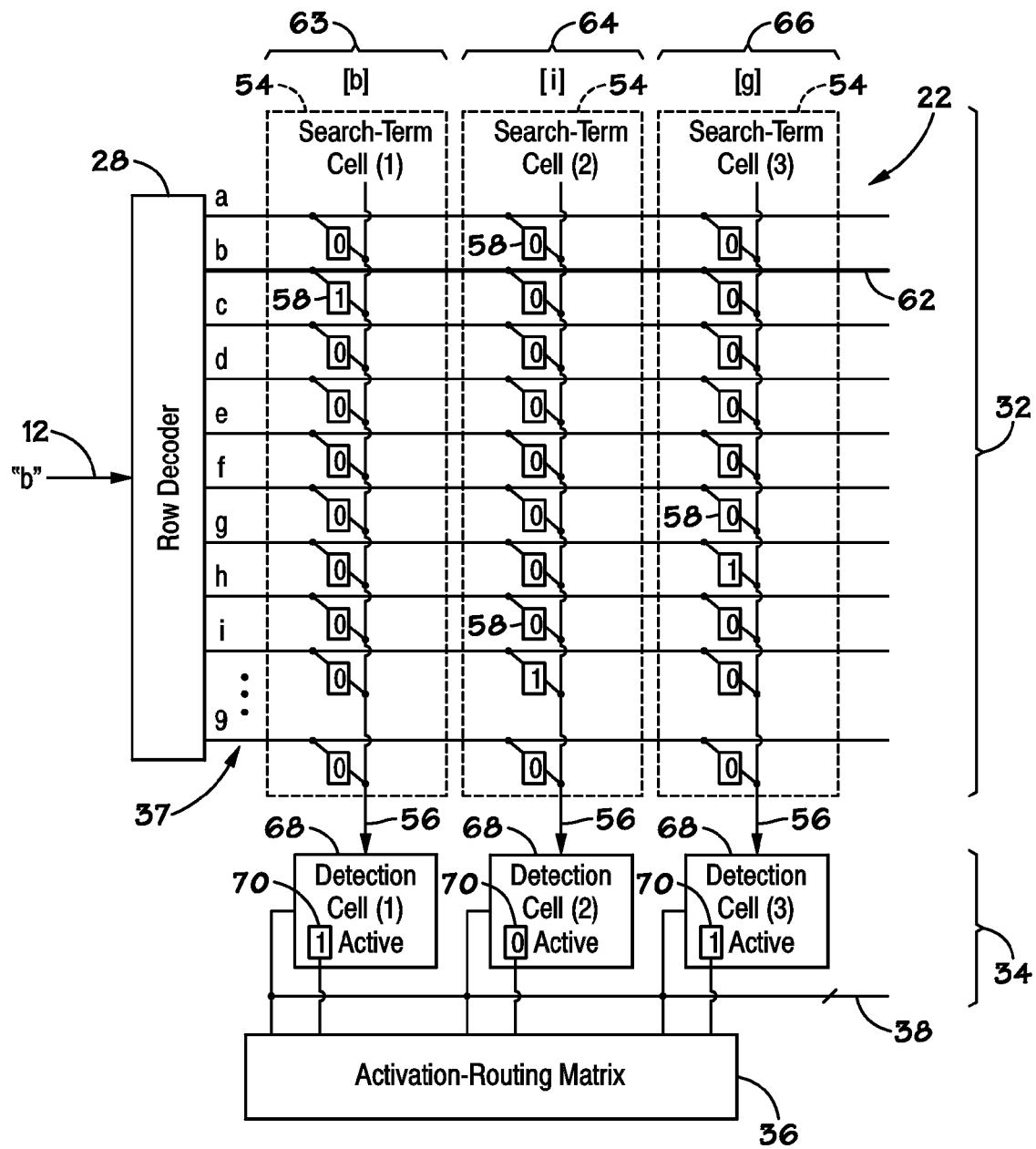
FIGS. 6-8 depict a recognition module including several search-term cells searching the data stream for a word.
Figure 7:
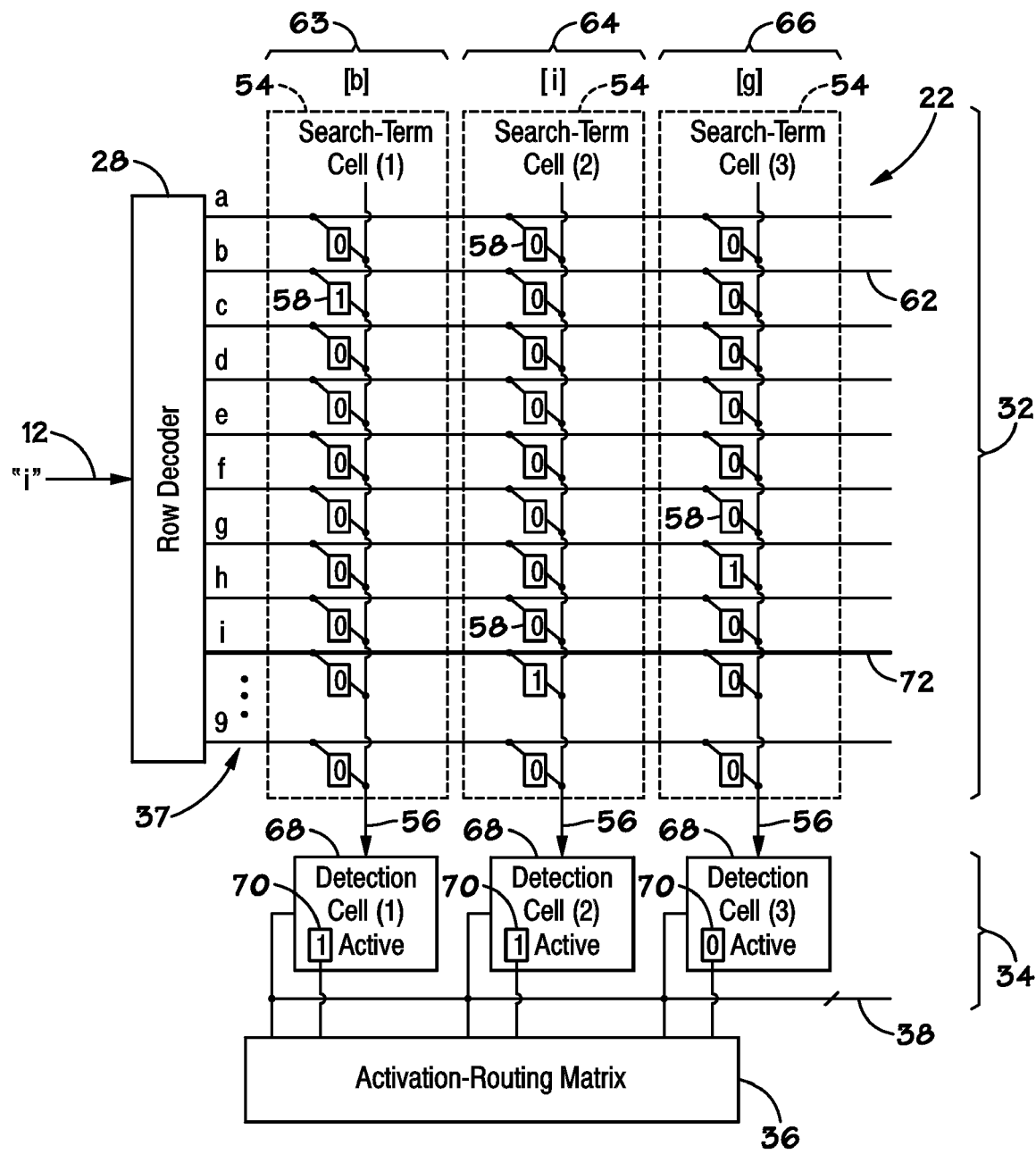
Figure 8:
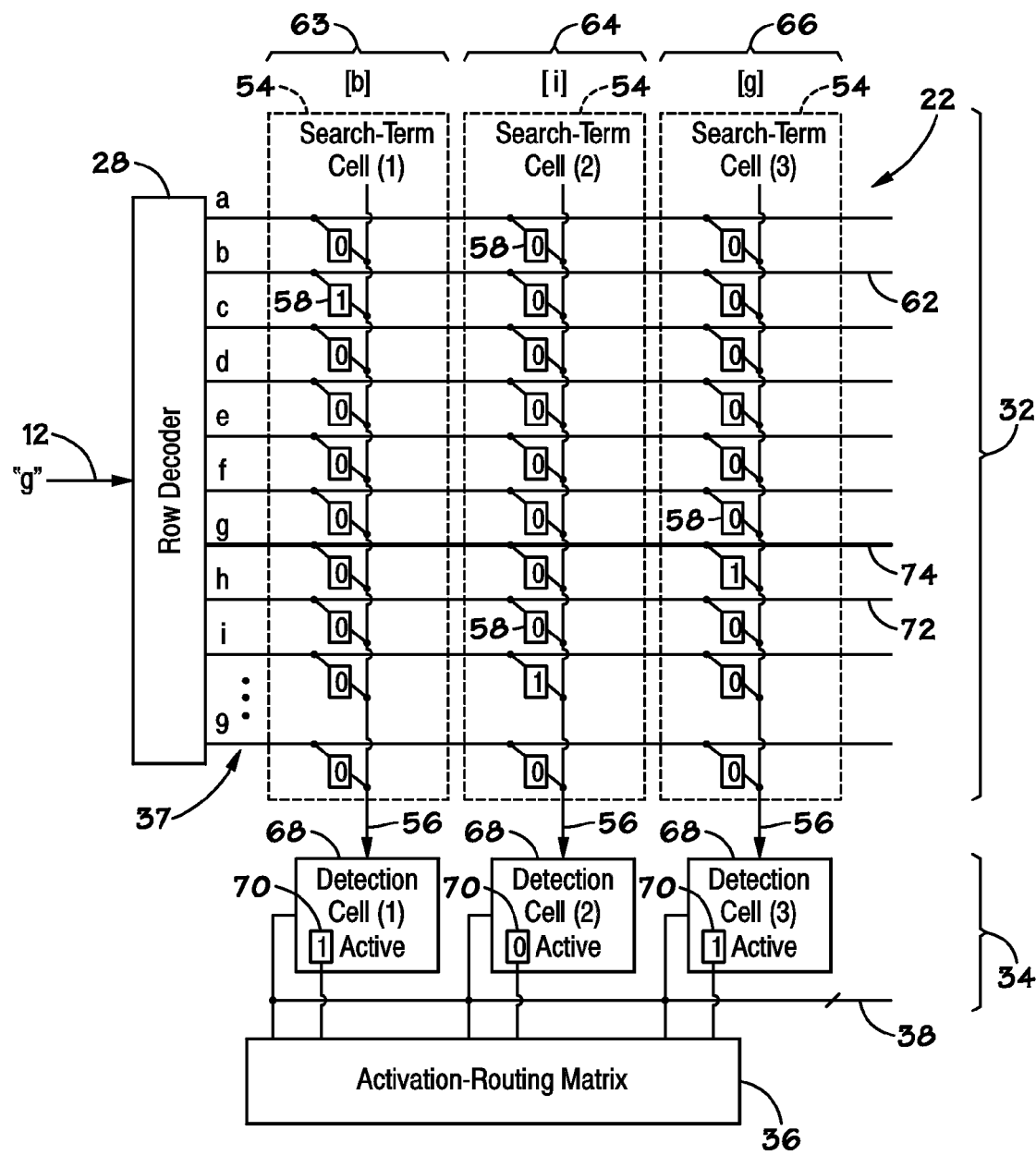

FIGS. 6-8 depict the recognition module 22 searching according to a multi-term search criterion, e.g., for a word. Specifically, FIG. 6 illustrates the recognition module 22 detecting the first letter of a word, FIG. 7 illustrates detection of the second letter, and FIG. 8 illustrates detection of the last letter.

As illustrated by FIG. 6, the recognition module 22 may be configured to search for the word "big". Three adjacent feature cells 63, 64, and 66 are illustrated. The feature cell 63 is configured to detect the letter "b". The feature cell 64 is configured to detect the letter "i". And the feature cell 66 is configured to both detect the letter "g" and indicate that the search criterion is satisfied.

FIG. 6 also depicts additional details of the detection array 34. The detection array 34 may include a detection cell 68 in each of the feature cells 63, 64, and 66. Each of the detection cells 68 may include a memory cell 70, such as one of the types of memory cells described above (e.g., a flip-flop), that indicates whether the feature cell 63, 64, or 66 is active or inactive. The detection cells 68 may be configured to output a signal to the activation-routing matrix 36 indicating whether the detection cell both is active and has received a signal from its associated search-term cell 54 indicating a match. Inactive features cells 63, 64, and 66 may disregard matches. Each of the detection cells 68 may include an AND gate with inputs from the memory cell 70 and the output conductor 56. The output of the AND gate may be routed to both the detection bus 38 and the activation-routing matrix 36, or one or the other.

The activation-routing matrix 36, in turn, may selectively activate the feature cells 63, 64, and 66 by writing to the memory cells 70 in the detection array 34. The activation-routing matrix 36 may activate feature cells 63, 64, or 66 according to the search criterion and which search term is being searched for next in the data stream 12.

In FIG. 6, the data stream 12 presents the letter "b". In response, each of the feature cells 63, 64, and 66 may output a signal on their output conductor 56, indicating the value stored in the memory cell 58 connected to the conductor 62, which represents the letter "b". The detection cells 56 may then each determine whether they have received a signal indicating a match and whether they are active. Because the feature cell 63 is configured to detect the letter "b" and is active, as indicated by its memory cell 70, the detection cell 68 in the feature cell 63 may output a signal to the activation-routing matrix 36 indicating that the first search term of the search criterion has been matched.

As illustrated by FIG. 7, after the first search term is matched, the activation-routing matrix 36 may activate the next feature cell 64 by writing a 1 to its memory cell 70 in its detection cell 68. The activation-routing matrix 36 may also maintain the active state of the feature cell 63, in case the next term satisfies the first search term, e.g., if the sequence of terms "bbig" is received. The first search term of search criteria may be maintained in an active state during a portion or substantially all of the time during which the data stream 12 is searched.

In FIG. 7, the data stream 12 presents the letter "i" to the recognition module 22. In response, each of the feature cells 63, 64, and 66 may output a signal on their output conductor 56, indicating the value stored in the memory cell 58 connected to the conductor 72, which represents the letter "i". The detection cells 56 may then each determine whether they have received a signal indicating a match and whether they are active. Because the feature cell 64 is configured to detect the letter "i" and is active, as indicated by its memory cell 70, the detection cell 68 in the feature cell 64 may output a signal to the activation-routing matrix 36 indicating that the next search term of its search criterion has been matched.

Next, the activation-routing matrix 36 may activate the feature cell 66, as illustrated by FIG. 8. Before evaluating the next term, the feature cell 64 may be deactivated. The feature cell 64 may be deactivated by its detection cell 68 resetting its memory cell 70 between detection cycles or the activation-routing matrix 36 may deactivate the feature cell 64, for example.

In FIG. 8, the data stream 12 presents the term "g" to the row decoder 28, which selects the conductor 74 representing the term "g". In response, each of the feature cells 63, 64, and 66 may output a signal on their output conductor 56, indicating the value stored in the memory cell 58 connected to the conductor 74, which represents the letter "g". The detection cells 56 may then each determine whether they have received a signal indicating a match and whether they are active. Because the feature cell 66 is configured to detect the letter "g" and is active, as indicated by its memory cell 70, the detection cell 68 in the feature cell 66 may output a signal to the activation routing matrix 36 indicating that the last search term of its search criterion has been matched.

The end of a search criterion or a portion of a search criterion may be identified by the activation-routing matrix 36 or the detection cell 68. These components 36 or 68 may include memory indicating whether their feature cell 63, 64, or 66 specifies the last search term of a search criterion or a component of a search criterion. For example, a search criterion may specify all sentences in which the word "cattle" occurs twice, and the recognition module may output a signal indicating each occurrence of "cattle" within a sentence to the aggregation module, which may count the occurrences to determine whether the search criterion is satisfied.

Feature cells 63, 64, or 66 may be activated under several conditions. A feature cell 63, 64, or 66 may be "always active", meaning that it remains active during all or substantially all of a search. An example of an always active feature cell 63, 64, or 66 is the first feature cell of the search criterion, e.g., feature cell 63.

A feature cell 63, 64, or 66 may be "active when requested", meaning that the feature cell 63, 64, or 66 is active when some condition precedent is matched, e.g., when the preceding search terms in a search criterion are matched. An example is the feature cell 64, which is active when requested by the feature cell 63 in FIGS. 6-8, and the feature cell 66, which active when requested by the feature cell 64.

A feature cell 63, 64, or 66 may be "self activated", meaning that once it is activated, it activates itself as long as its search term is matched. For example, a self activated feature cell having a search term that is matched by any numerical digit may remain active through the sequence "123456xy" until the letter "x" is reached. Each time the search term of the self activated feature cell is matched, it may activate the next feature cell in the search criterion. Thus, an always active feature cell may be formed from a self activating feature cell and an active when requested feature cell: the self activating feature cell may be programmed with all of its memory cells 58 storing a 1, and it may repeatedly activate the active when requested feature cell after each term. In some embodiments, each feature cell 63, 64, and 66 may include a memory cell in its detection cell 68 or in the activation-routing matrix 36 that specifies whether the feature cell is always active, thereby forming an always active feature cell from a single feature cell.

Figure 9:
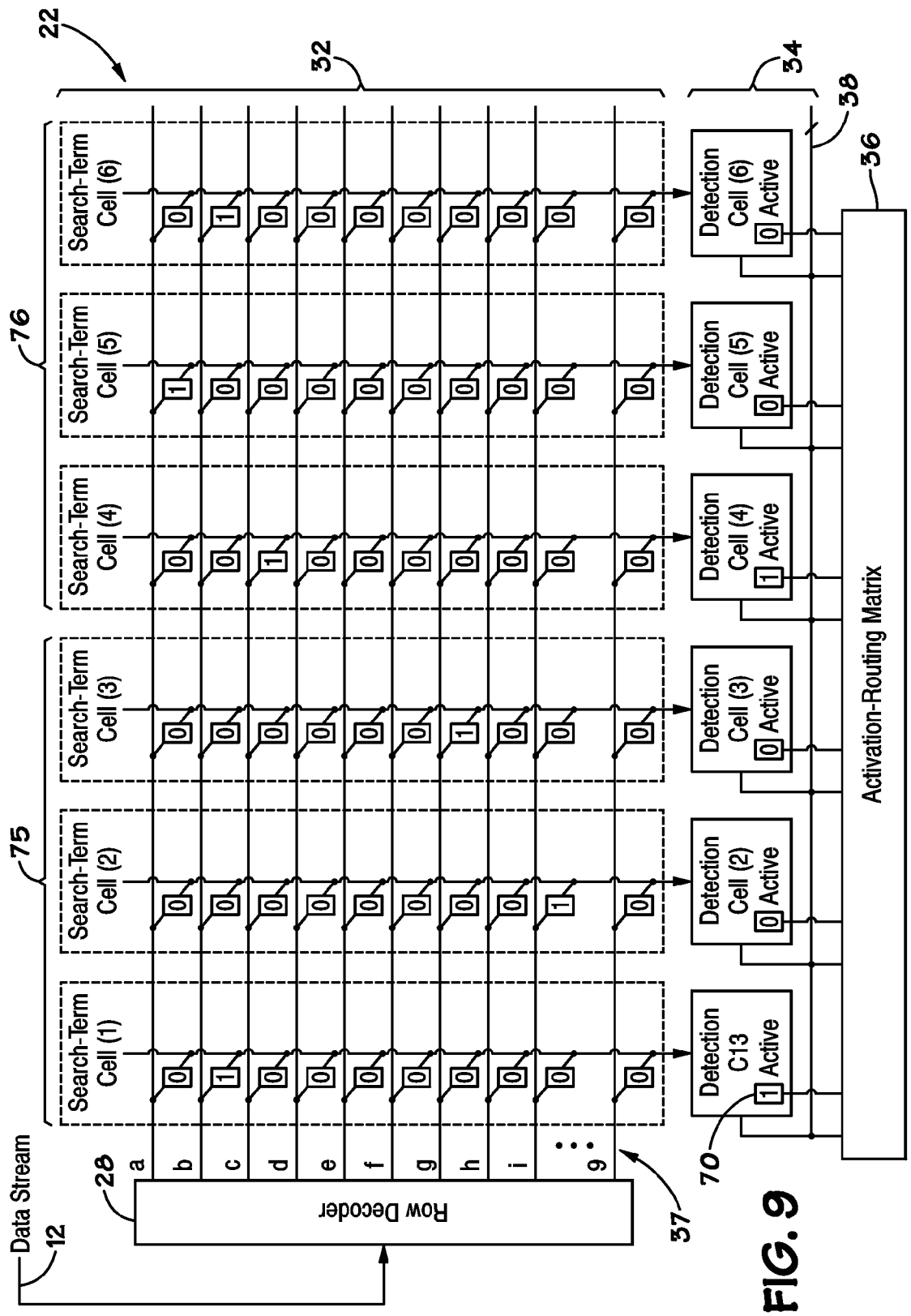
FIG. 9 depicts the recognition module configured to search the data stream for two words in parallel.

FIG. 9 depicts an example of a recognition module 22 configured to search according to a first search criterion 75 and a second search criterion 76 in parallel. In this example, the first search criterion 75 specifies the word "big", and the second search criterion 76 specifies the word "cab". A signal indicative of the current term from the data stream 12 may be communicated to feature cells in each search criterion 75 and 76 at generally the same time. Each of the input conductors 37 spans both of the search criteria 75 and 76. As a result, in some embodiments, both of the search criteria 75 and 76 may evaluate the current term generally simultaneously. This is believed to speed the evaluation of search criteria. Other embodiments may include more feature cells configured to evaluate more search criteria in parallel. For example, some embodiments may include more than 100, 500, 1000, 5000, or 10,000 feature cells operating in parallel. These feature cells may evaluate hundreds or thousands of search criteria generally simultaneously.

Search criteria with different numbers of search terms may be formed by allocating more or fewer feature cells to the search criteria. Simple search criteria may consume fewer resources in the form of feature cells than complex search criteria. This is believed to reduce the cost of the pattern-recognition processor 14 (FIG. 2) relative to processors with a large number of generally identical cores, all configured to evaluate complex search criteria.

Figure 10:
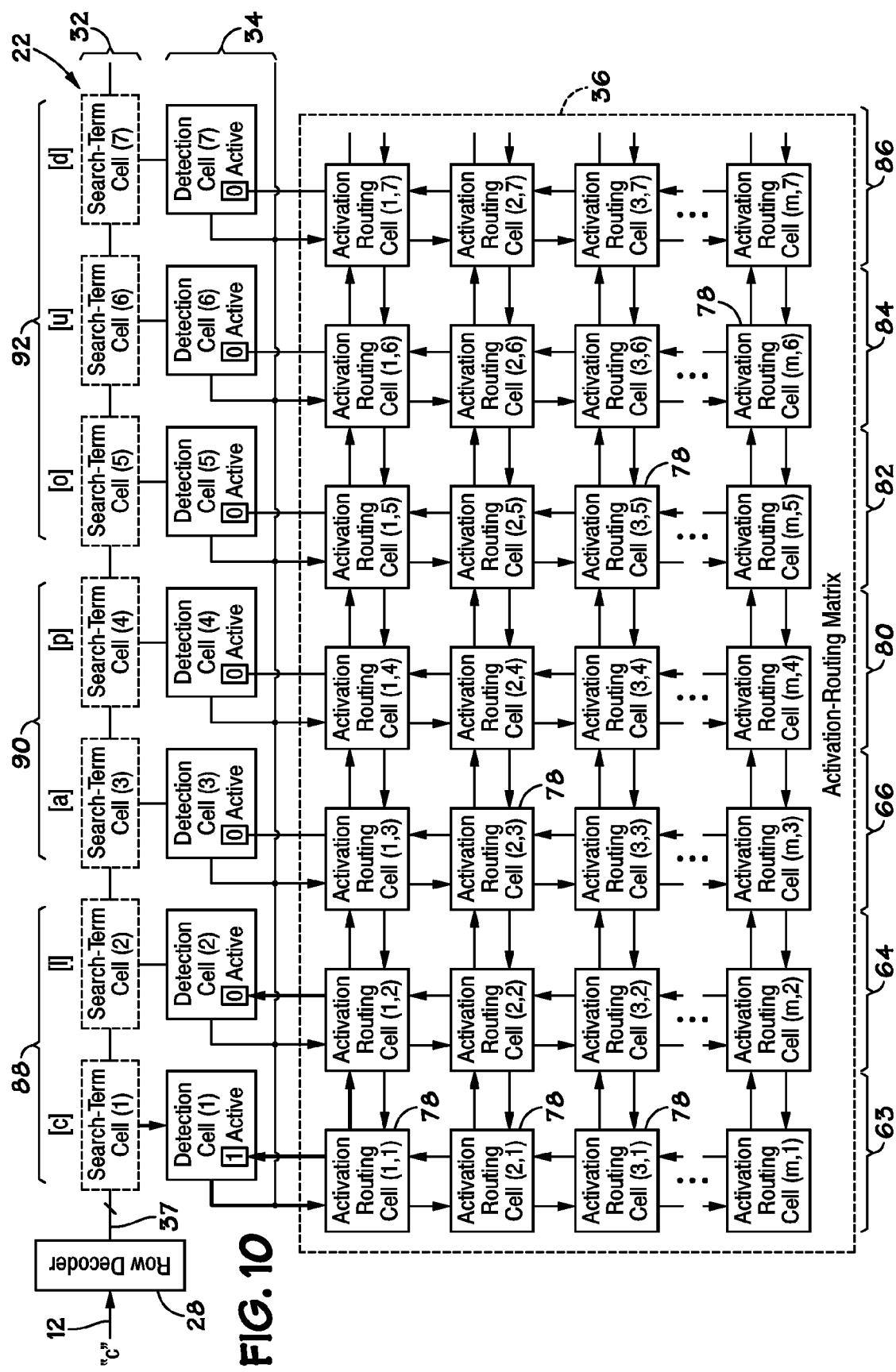
FIGS. 10-12 depict the recognition module searching according to a search criterion that specifies multiple words with the same prefix.
Figure 11:
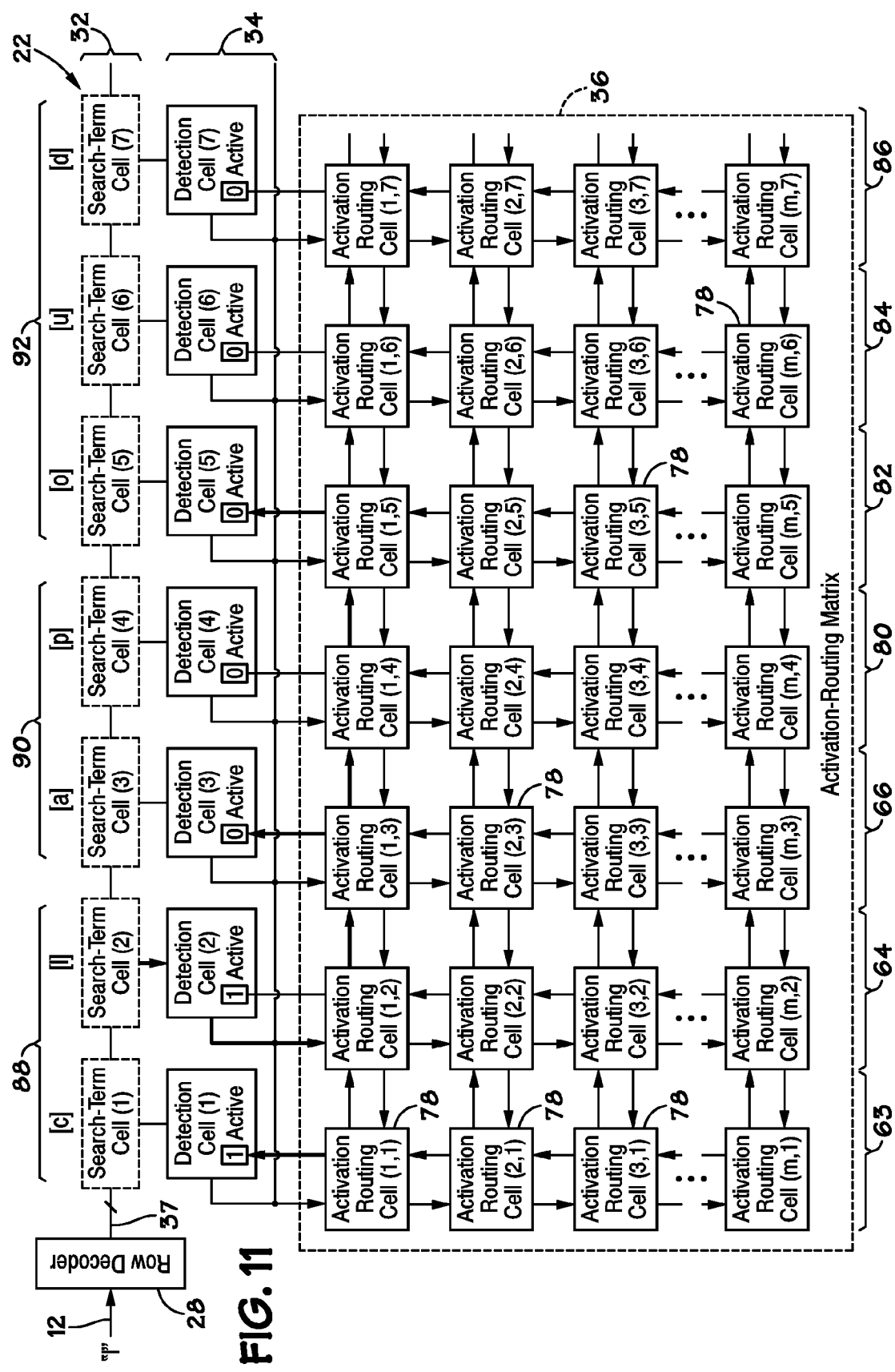
Figure 12:
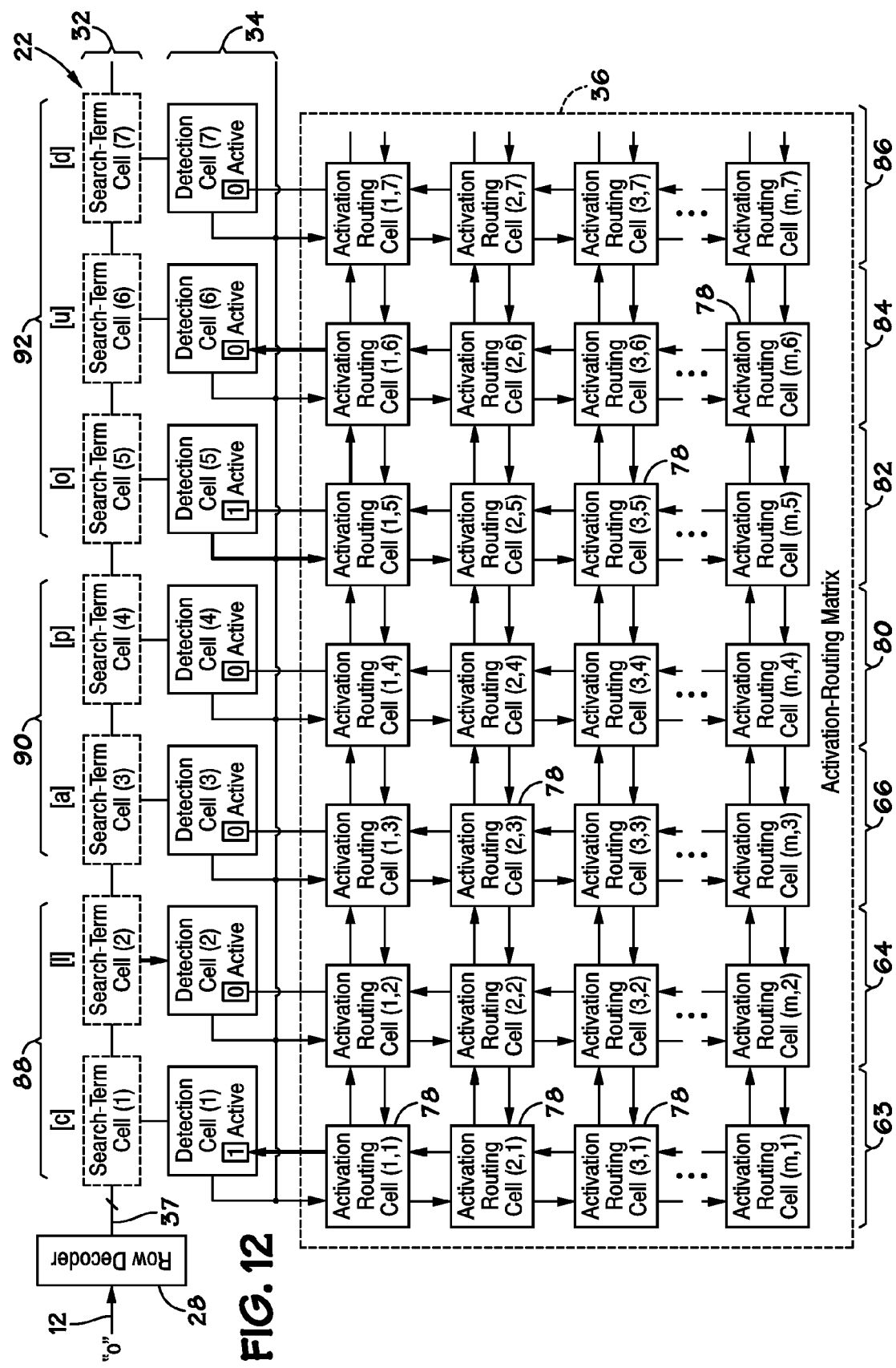

FIGS. 10-12 depict both an example of a more complex search criterion and features of the activation-routing matrix 36. The activation-routing matrix 36 may include a plurality of activation-routing cells 78, groups of which may be associated with each of the feature cells 63, 64, 66, 80, 82, 84, and 86. For instance, each of the feature cells may include 5, 10, 20, 50, or more activation-routing cells 78. The activation-routing cells 78 may be configured to transmit activation signals to the next search term in a search criterion when a preceding search term is matched. The activation-routing cells 78 may be configured to route activation signals to adjacent feature cells or other activation-routing cells 78 within the same feature cell. The activation-routing cells 78 may include memory that indicates which feature cells correspond to the next search term in a search criterion.

As illustrated by FIGS. 10-12, the recognition module 22 may be configured to search according to complex search criteria than criteria that specify single words. For instance, the recognition module 22 may be configured to search for words beginning with a prefix 88 and ending with one of two suffixes 90 or 92. The illustrated search criterion specifies words beginning with the letters "c" and "l" in sequence and ending with either the sequence of letters "ap" or the sequence of letters "oud". This is an example of a search criterion specifying multiple target expressions, e.g., the word "clap" or the word "cloud".

In FIG. 10, the data stream 12 presents the letter "c" to the recognition module 22, and feature cell 63 is both active and detects a match. In response, the activation-routing matrix 36 may activate the next feature cell 64. The activation-routing matrix 36 may also maintain the active state of the feature cell 63, as the feature cell 63 is the first search term in the search criterion.

In FIG. 11, the data stream 12 presents a letter "l", and the feature cell 64 recognizes a match and is active. In response, the activation-routing matrix 36 may transmit an activation signal both to the first feature cell 66 of the first suffix 90 and to the first feature cell 82 of the second suffix 92. In other examples, more suffixes may be activated, or multiple prefixes may active one or more suffixes.

Next, as illustrated by FIG. 12, the data stream 12 presents the letter "o" to the recognition module 22, and the feature cell 82 of the second suffix 92 detects a match and is active. In response, the activation-routing matrix 36 may activate the next feature cell 84 of the second suffix 92. The search for the first suffix 90 may die out, as the feature cell 66 is allowed to go inactive. The steps illustrated by FIGS. 10-12 may continue through the letters "u" and "d", or the search may die out until the next time the prefix 88 is matched.

Figure 13:
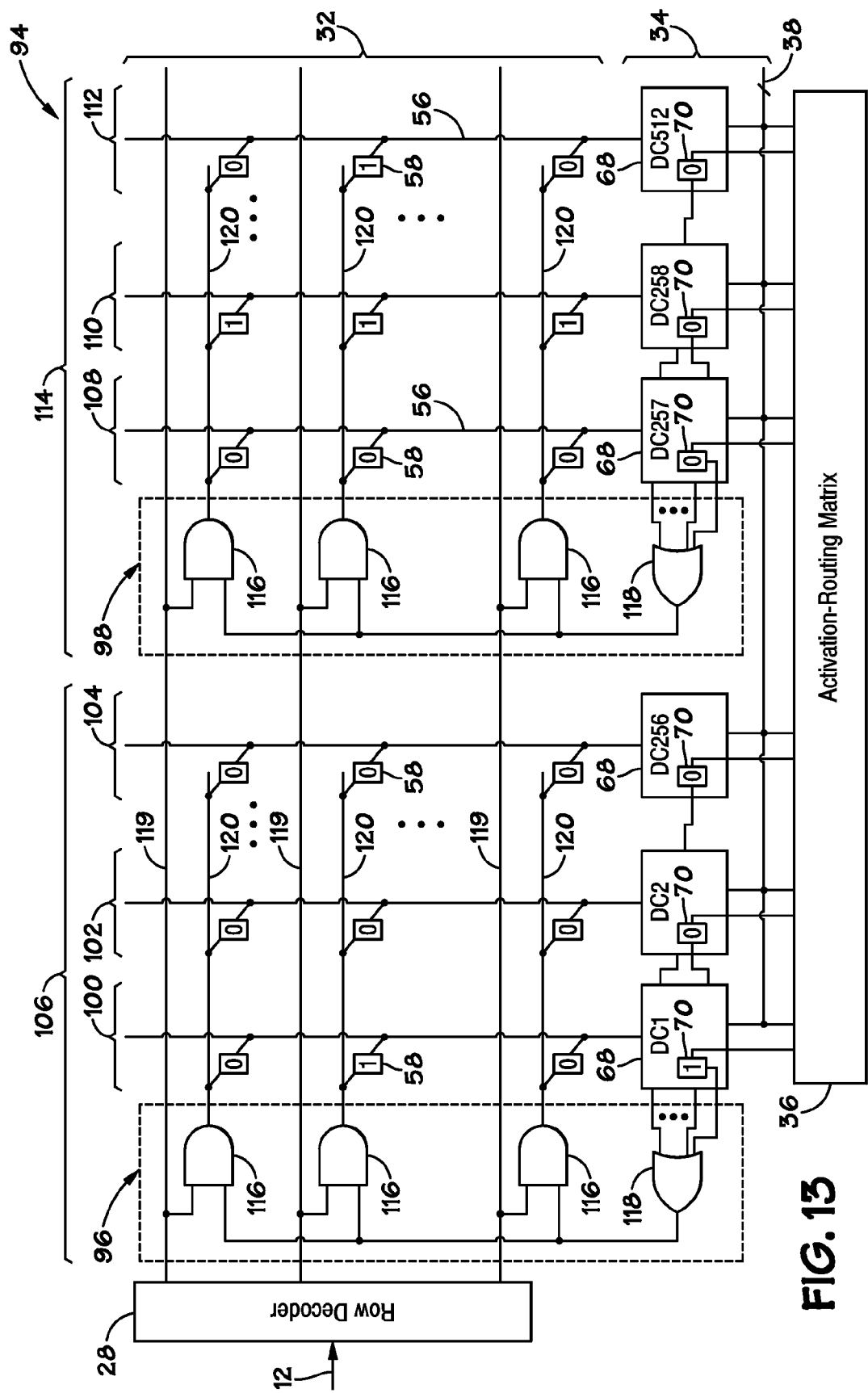
FIGS. 13-15 depict an example of block-disabling circuitry in the pattern-recognition processor of FIG. 2.

FIG. 13 illustrates an embodiment of the recognition-module 94 including block-disabling circuitry 96 and 98. The block-disabling circuit 96 may be configured to selectively disable feature cells 100, 102, and 104 in a block of feature cells 106, and the block-disabling circuit 98 may be configured to selectively disable feature cells 108, 110, and 112 in another block of feature cells 114.

The blocks of feature cells 106 and 114 may each include a plurality of feature cells, e.g., a number greater than or equal to about 4, 8, 16, 32, 64, 128, 256, 512, 1024, or 2048. The number of feature cells in each of the blocks 106 and 114 may be about equal, or the blocks 106 and 114 may have a different number of feature cells from each other. The illustrated recognition module 94 includes two blocks 106 and 114, but other embodiments may include many more, e.g., hundreds or thousands more. Each of the blocks 106 and 114 includes a group of feature cells that are adjacent to one another, but in other embodiments, the feature cells within one block may be interleaved with feature cells from another block. The blocks 106 and 114 each include one block-disabling circuit 96 or 98, but other embodiments may include more than one block-disabling circuit. For example, within a block, one block-disabling circuit may be configured to disable a lower portion of the feature cells within the block, and another block-disabling circuit may be configured to disable an upper portion of the feature cells within the block. The block-disabling circuits 96 and 98 may be disposed at one side of each of the blocks 106 and 114, respectively, e.g., the side closer to the row decoder 28, or in other embodiments, the block-disabling circuits 96 and 98 may be disposed near the other side of the blocks 106 and 114 or among the feature cells within the blocks 106 and 114. For example, the block-disabling circuits 96 and 98 may be disposed near the middle of each of the blocks 106 and 114 to reduce the distance that signals from the block-disabling circuits 96 and 98 travel to reach the edges of the blocks 106 and 114.

Each of the block-disabling circuits 96 and 98 may include a plurality of AND gates 116 and an OR gate 118. The AND gates 116 may each have two input terminals: one that connects to the output of the OR gate 118 and one that connects to a global input conductor 119. The output of each of the AND gates 116 may connect to a local input conductor 120. The local input conductors 120 may connect to each of the memory cells 58 within a block 106 or 114, but not the memory cells 58 within other blocks 106 or 114. The local input conductors 120 may transmit signals to the memory cells 58 that cause the memory cells 58 to output their stored value. Thus, the local input conductors 120 may function similar to the input conductors 37 described above with reference to FIGS. 2-12. The global input conductors 119 may connect to AND gates 116 in each of the blocks 106 and 114, thereby making input signals available to each of the blocks 106 and 114.

The OR gates 118 may each have input terminals that connect to the detection cells 68 within their associated block 106 or 114. Specifically, the input terminals of the OR gates 118 may connect to the memory cells 70 in each of the detection cells 68. As a result, the output of the OR gates 118 may indicate whether any of the feature cells within their associated block 106 or 114 is active. If none of the feature cells within the associated block 106 or 114 is active, then the OR gate 118 may output a logic low signal or other signal indicating that none of the feature cells is active. If at least one of the feature cells within the associated block 106 or 114 is active, then the OR gate 118 may output a logic high signal or other signal indicating that at least one of the feature cells is active.

Figure 14:
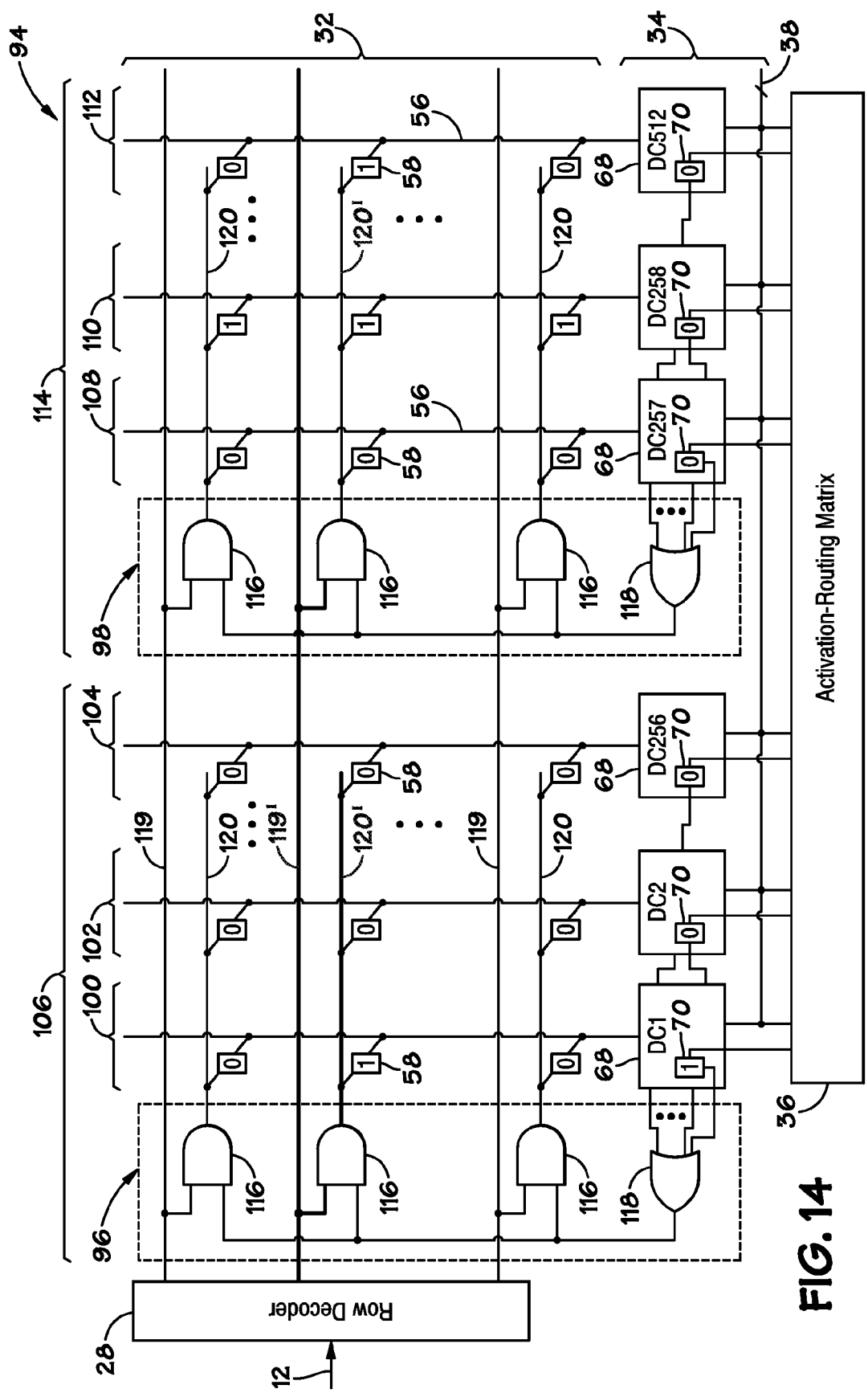
Figure 15:
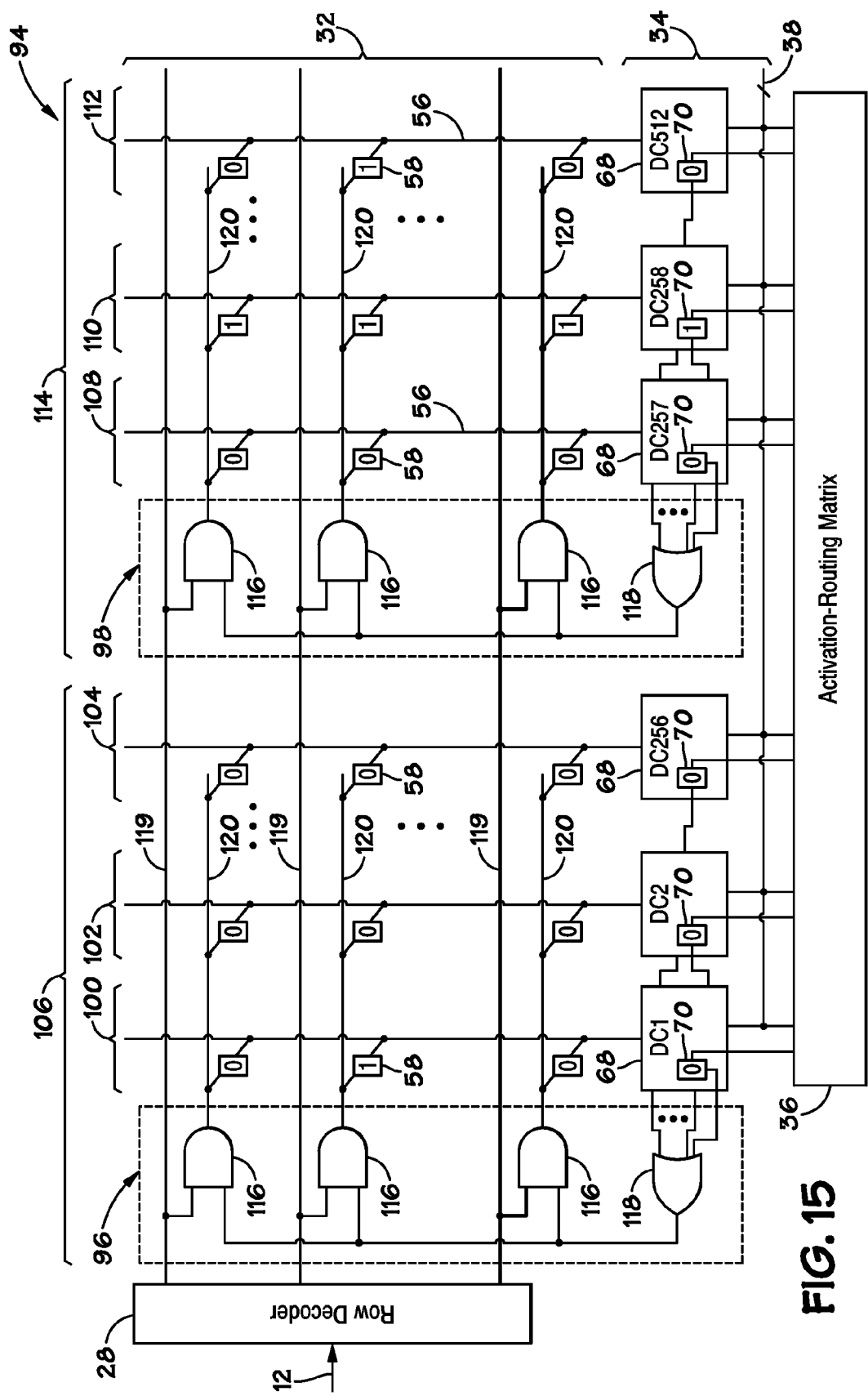

The operation of the recognition module 94 is illustrated by FIGS. 14-15. In FIG. 14, the recognition module 94 is configured such that the feature cell 100 in block 106 is active and none of the feature cells in block 114 are active. As a result, the feature cells in block 114 are disabled by the block-disabling circuit 98, while the feature cells in block 106 receive signals from the row decoder 28.

In this example, the data stream 12 presents a term that causes the row decoder 28 to transmit a signal on the global input conductor 119'. This signal is received by the feature cells in the block 106, but not the feature cells in the block 114. Block 114 may be disabled because none of the feature cells in the block 114 are active. As a result of not including any active feature cells, the OR gate 118 in the block 114 may output a logic low signal. Thus, one of the inputs of each of the AND gates 116 in the block-disabling circuit 98 may be logic low, and consequently, none of the AND gates 116 transmits the signal from the global input conductor 119' to the local input conductor 120', thereby preventing the memory cells 58 in the block 114 from outputting their stored values.

Disabling blocks with no active feature cells is believed to reduce power consumption. Rather than all of the feature cells in the recognition module 94 outputting a value from the memory cell 58 associated with a received term, a subset of the feature cells do not output stored values. In the present example, power may be saved because none of the feature cells in the block 114 output a value when a new term is presented. This is believed to conserve electrical energy as no current is drawn by the output conductors 56 in the block 114.

Disabling the feature cells in the block 114, however, does not impair operation of the recognition module 94, as none of the feature cells in block 114 are active. Thus, even if one of the feature cells in block 114 specifies a term presented by the data stream 12, those feature cells would not respond to that term because they would not both have a match and be active.

FIG. 15 illustrates another example of the operation of the recognition module 94. In FIG. 15, all of the feature cells in block 106 have become inactive, and one of the feature cells in block 114 has been activated. As a result, the block-disabling circuit 96 disables block 106, while block 114 may remain operational. In this example, the OR gate 118 in block 106 may output a logic low value, as each of its inputs is logic low. In contrast, the OR gate 118 in block 114 may output a logic high value, as at least one of its inputs is logic high. This logic high output may be received by each of the AND gates 116 in block 114, and signals on the global input conductors 119 may be transmitted to the local input conductors 120 in block 114, but not the local input conductors 120 in block 106. Again, electrical energy may be saved and heat generation reduced by not reading from the memory cells 58 in block 106.

In other examples, both blocks 106 and 114 may include at least one feature so that is active. In these instances, the recognition module 94 may function similarly or generally identical to the recognition module 22 described above with reference to FIGS. 2-12.

Figure 16:
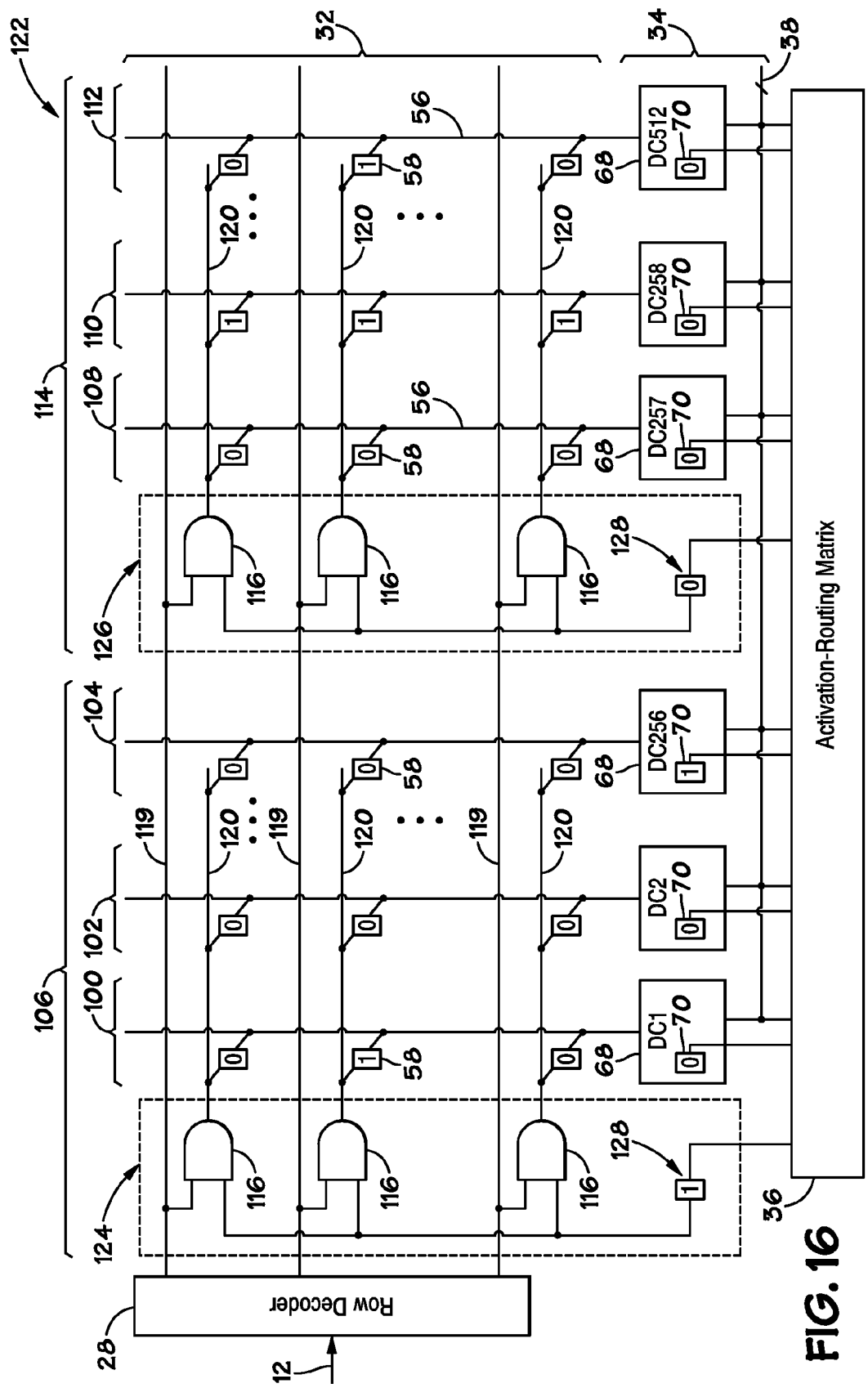
FIGS. 16-17 illustrate a second example of block-disabling circuitry in the pattern-recognition processor of FIG. 2.

FIG. 16 illustrates another embodiment of a recognition module 122. The recognition module 122 may include block-disabling circuits 124 and 126, which may each have a memory cell 128 that indicates whether any of the feature cells in their associated blocks 106 or 114 are active. The memory cells 128 may output their stored value to one of the inputs of the AND gates 116 in their associated block-disabling circuit 124 or 126. The memory cells 128 may include any of the previously described types of memory cells.

The values stored by the memory cells 128 may be written to the memory cells 128 by the activation-routing matrix 36. For example, the activation-routing matrix 36 may be configured to store a logic high value in each of the memory cells 128 whenever a feature cell within the associated block 106 or 114 is activated. The activation-routing matrix 36 may also be configured to store a logic low value in the memory cells 128 when all of the feature cells within the memory cell's associated block 106 or 114 are inactivated.

Figure 17:
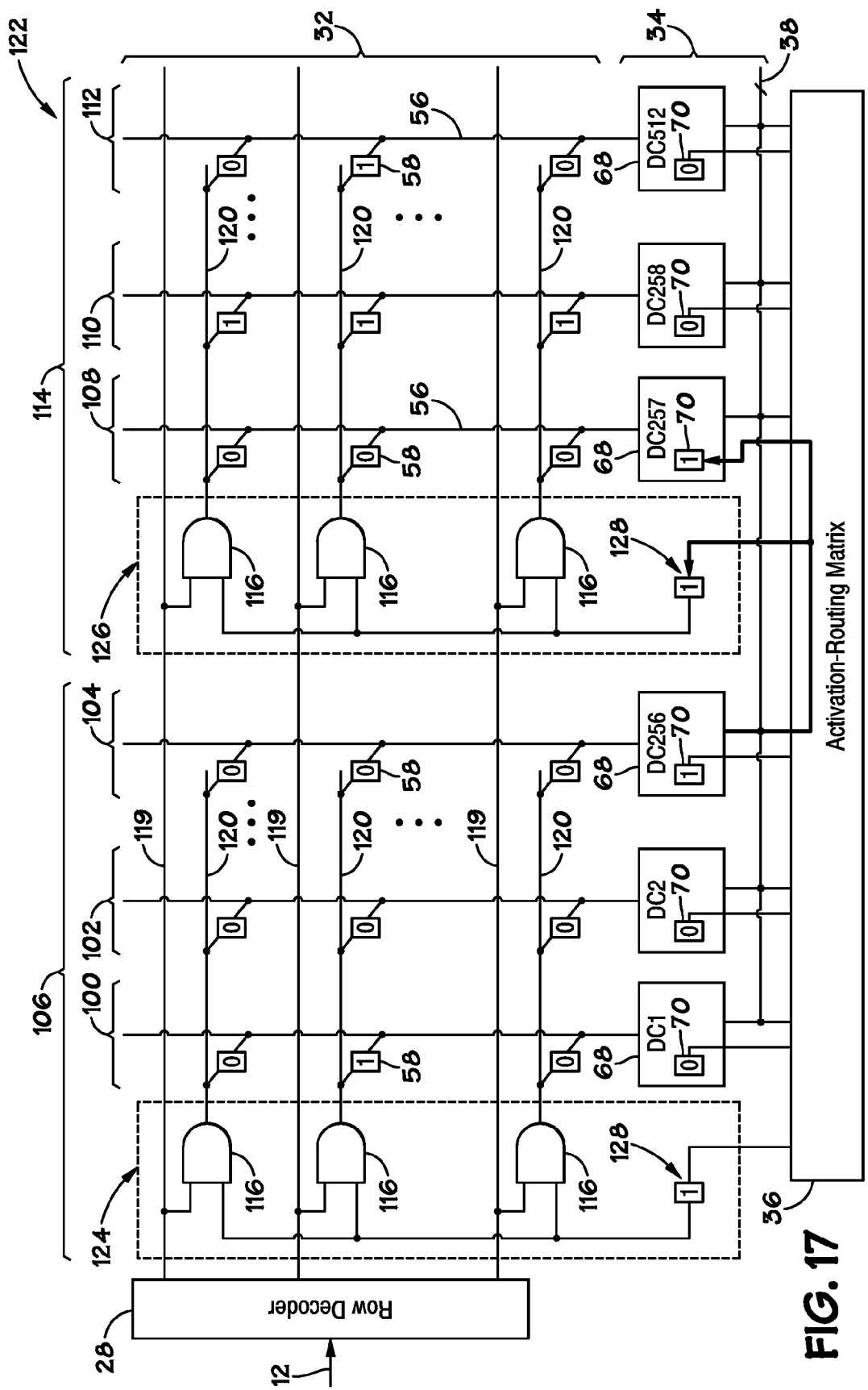

FIG. 17 illustrates the recognition module 122 in operation. The feature cell 104 in block 106 is both active and has detected a match in FIG. 17. Its detection cell 68 indicates this with a signal to the activation-routing matrix 36. In response, the activation-routing matrix 36 writes a logic high value to the memory cell 128 in the block-disabling circuit 126 and in the memory cell 70 in the feature cell 108. As a result, block 114 is rendered operational. During subsequent operation, if the feature cell 108 becomes inactive and none of the other feature cells in block 114 are activated, the activation-routing matrix 36 may store a logic low value in the memory cell 128 in the block-disabling circuit 126, thereby disabling the block 114 and conserving power that the block 114 might otherwise consume.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A device, comprising:
 a pattern-recognition processor comprising:
  a decoder;
  a first block of feature cells coupled to the decoder via a first plurality of local input conductors, a first block-disabling circuit, and a plurality of global input conductors; and
  a second block of feature cells coupled to the decoder via a second plurality of local input conductors, a second block-disabling circuit, and the plurality of global input conductors;
  wherein the first block-disabling circuit is configured to disable the first block of features cells if the first block of features cells is inactive; and
  wherein the second block-disabling circuit is configured to disable the second block of features cells if the second block of features cells is inactive.

2. The device of claim 1, wherein each of the first plurality of local input conductors is coupled to one of a plurality of memory cells in each feature cell in the first block of feature cells.

3. The device of claim 1, wherein the decoder is coupled to an input data stream and the pattern-recognition processor is configured to search the data stream according to a plurality of search criteria encoded by the first block of feature cells and the second block of feature cells.

4. The device of claim 1, wherein the first block-disabling circuit comprises a plurality of AND gates each having an output terminal coupled to one of the local input conductors among the first plurality of local input conductors.

5. The device of claim 4, wherein the plurality of AND gates each have an input terminal coupled to one of the global input conductors among the plurality of global input conductors.

6. The device of claim 4, wherein the plurality of AND gates each have an input terminal coupled to an output terminal of an OR gate.

7. The device of claim 6, wherein the OR gate has a plurality of input terminals each coupled to a detection cell in one of the feature cells in the first plurality of feature cells.

8. The device of claim 6, wherein the OR gate has a plurality of input terminals each coupled to a memory cell configured to output a value indicative of whether one or more feature cells in the first plurality of feature cells is active.

9. The device of claim 6, wherein the OR gate comprises a plurality of input terminals each coupled to a memory cell in a detection cell in one of the feature cells in the first plurality of feature cells.

10. The device of claim 4, wherein the plurality of AND gates each comprise an input terminal coupled to a memory cell.

11. The device of claim 10, comprising an activation-routing matrix coupled to the memory cell, wherein the activation-routing matrix is configured to store a value in the memory cell that is indicative of whether any feature cells in the first plurality of feature cells is active.

12. The device of claim 1, wherein the first block of feature cells comprises more than 255 feature cells and the second block of feature cells comprises more than 255 feature cells.

13. A method, comprising:
 receiving a signal from a global input conductor;
 determining via block disabling circuitry whether any feature cells in a block of feature cells is active; and
 if at least one feature cell in the block of feature cells is active, transmitting the signal from the global input conductor through the block disabling circuitry to a local input conductor coupled to the block of feature cells; and
 if no feature cell in the block of feature cells is active, disabling the block of features cells via the block-disabling circuitry.

14. The method of claim 13, wherein receiving a signal from a global input conductor comprises receiving a signal from a global input conductor coupled to a plurality of blocks of feature cells.

15. The method of claim 13, wherein receiving a signal from a global input conductor comprises receiving a signal from a decoder.

16. The method of claim 13, wherein determining whether any feature cells in a block of feature cells is active comprises outputting a signal from an OR gate coupled to each of the feature cells in the block of feature cells.

17. The method of claim 13, wherein determining whether any feature cells in the block of feature cells is active comprises outputting a value stored by a memory cell, wherein the value is indicative of whether any of the feature cells in the block of feature cells is active.

18. The method of claim 13, wherein transmitting the signal from the global input conductor to the local input conductor comprises transmitting the signal from the output terminal of an AND gate.

19. The method of claim 13, wherein transmitting the signal from the global input conductor to the local input conductor comprises transmitting the signal from the global input conductor to a plurality of local input conductors each associated with different blocks of feature cells including at least one active feature cell.

20. The method of claim 13, comprising searching a data stream according to search criteria.

21. The method of claim 20, comprising receiving the search criteria from a remote server.

22. A system, comprising:
 a processing unit (PU); and
 a pattern-recognition processor coupled to the PU, wherein the pattern-recognition processor comprises
  one or more blocks, each comprising one or more feature cells; and
  one or more block-disabling circuits connected to the one or more blocks, wherein each of the one or more block-disabling circuits is configured to disable a respective one of the one or more blocks if the respective one of the one or more blocks is inactive.

23. The system of claim 22, wherein the pattern-recognition processor comprises a plurality of blocks of feature cells, and wherein each block of feature cells among the plurality of blocks of feature cells is associated with one of the block-disabling circuits among the plurality of block-disabling circuits.

24. The system of claim 22, wherein each block-disabling circuit among the plurality of block-disabling circuits is configured to selectively prevent signals from a data stream being searched by the pattern-recognition processor from reaching a block of feature cells that does not include any active feature cells.

25. The system of claim 22, wherein the pattern-recognition processor comprises a row decoder coupled to each of the block-disabling circuits among the plurality of block-disabling circuits.

26. The system of claim 25, wherein the pattern-recognition processor comprises a plurality of global input conductors that couple the row decoder to each of the block-disabling circuits among the plurality of block-disabling circuits.

27. The system of claim 26, wherein the pattern-recognition processor comprises a plurality of local input conductors selectively coupled to each of the plurality of global input conductors by the plurality of block-disabling circuits.

28. The system of claim 26, wherein the pattern-recognition processor comprises:
   a plurality of blocks of feature cells, each block coupled to one of the block disabling circuits;
   an activation-routing matrix coupled to each of the blocks of feature cells; and
   an aggregation module coupled to each of the blocks of feature cells.

29. The system of claim 22, wherein the PU and the pattern recognition module are part of a network switch, a router, a personal computer, or a server.

30. A method, comprising:
   receiving a data stream;
   searching the data stream via a pattern recognition processor according to search criteria, wherein each of the search criteria comprises a plurality of search terms, and wherein the plurality of search terms are grouped into a first block of search terms and a second block of search terms;
   determining at block-disabling circuitry whether any search terms in the first block of search terms is active; and
   if no search terms in the first block of search terms are active, disabling the first block of search terms.

31. The method of claim 30, wherein receiving the data stream comprises receiving a packet of data over a network.

32. The method of claim 30, wherein the search terms are encoded in memory in feature cells.

33. The method of claim 30, comprising:
   determining whether any search terms in the second block of search terms is active; and
   if no search terms in the second block of search terms are active, disabling the second block of search terms.

34. The method of claim 30, wherein disabling the first block of search terms comprises preventing a signal from being transmitted between a global input conductor and a local input conductor associated with the first block of search terms.

* * * * *